US008363060B2

(12) United States Patent
Igarashi

(10) Patent No.: US 8,363,060 B2
(45) Date of Patent: Jan. 29, 2013

(54) DRAWING PROCESSING DEVICE, IMAGE OUTPUT APPARATUS, AND COMPUTER-READABLE MEDIUM

(75) Inventor: Tatsuya Igarashi, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 715 days.

(21) Appl. No.: 12/541,687

(22) Filed: Aug. 14, 2009

(65) Prior Publication Data
US 2010/0238177 A1 Sep. 23, 2010

(30) Foreign Application Priority Data

Mar. 19, 2009 (JP) ................................. 2009-067502

(51) Int. Cl.
*G06T 1/00* (2006.01)
*G06T 15/00* (2006.01)
*G06K 9/00* (2006.01)
*G06K 9/46* (2006.01)
*G06K 9/66* (2006.01)
(52) U.S. Cl. ......................... 345/522; 382/181; 382/190
(58) Field of Classification Search .................. 382/181, 382/191
See application file for complete search history.

(56) References Cited

U.S. PATENT DOCUMENTS
5,963,655 A 10/1999 Sakurai

FOREIGN PATENT DOCUMENTS
JP A-8-16801 1/1996
JP A-2003-288587 10/2003

OTHER PUBLICATIONS
Japanese Office Action issued in Japanese Patent Application No. 2009-067502 dated Feb. 9, 2011 (with translation).

*Primary Examiner* — Jacinta M Crawford
(74) *Attorney, Agent, or Firm* — Oliff & Berridge, PLC

(57) ABSTRACT

A drawing processing device includes a rendering section, first and second figure drawing sections, a registration section, and a control section. The rendering section performs rendering based on a drawing command. The first figure drawing section draws a figure based on a figure pattern obtained by performing the rendering. When the rendering section performs the rendering for a figure, the registration section registers the figure pattern for the figure. If a figure drawing command is received and if a figure pattern corresponding to the received figure drawing command is stored, the second figure drawing section selects the corresponding registered figure pattern and draws a figure in place of the first figure drawing section. Based on an appearance state of figures in a page to be processed, the control section controls whether or not figure drawing performed by the second figure drawing section is caused to function in the page.

20 Claims, 33 Drawing Sheets

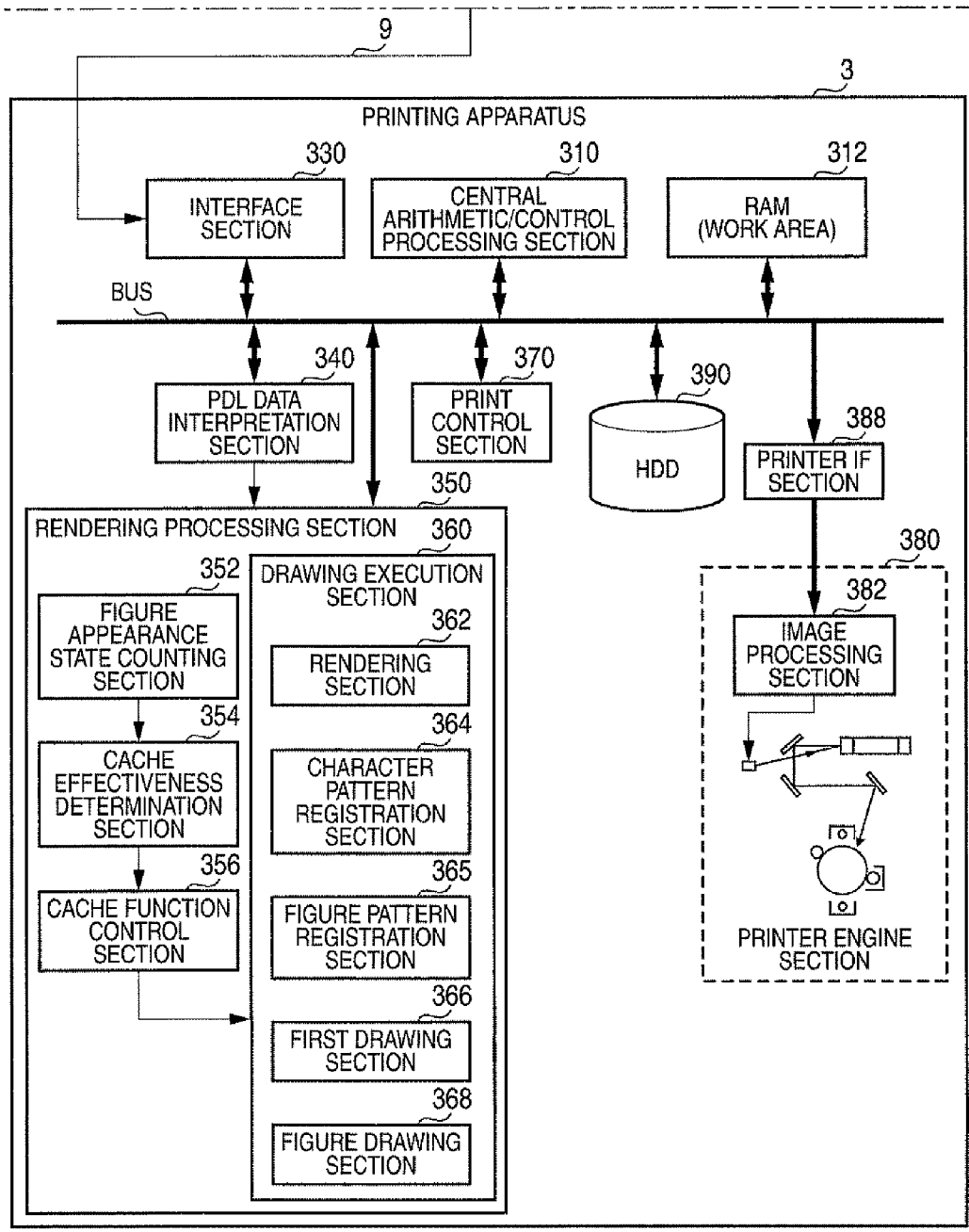

(FIG. 2 Continued)

<CASE OF HITTING>

<FIRST EXEMPLARY EMBODIMENT>

<RELATIONSHIP AMONG DETERMINATION THRESHOLD VALUES>

<MODE TRANSITION: FIRST EXEMPLARY EMBODIMENT>

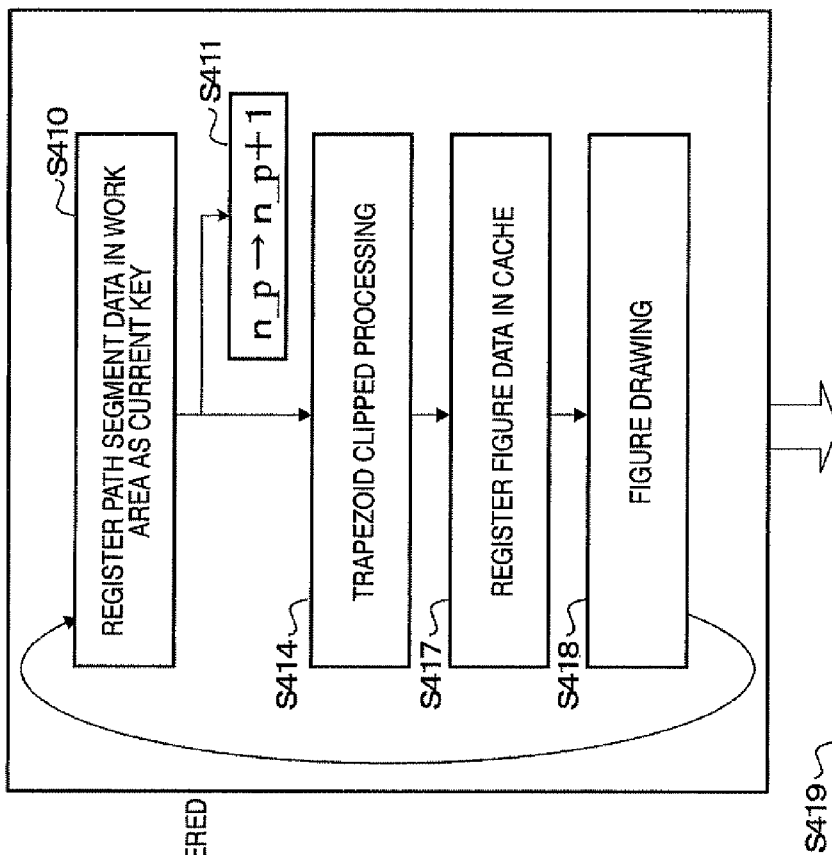

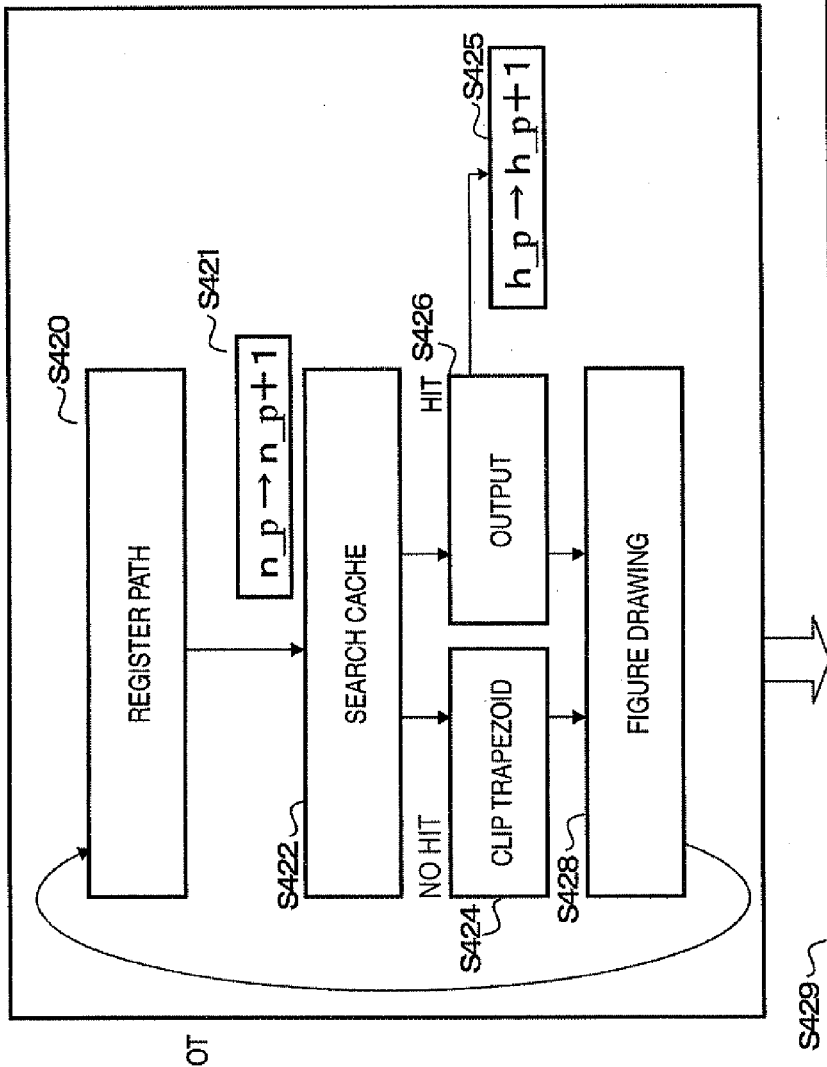

<PAGE PROCESSING IN EFFECTIVE MODE>

EXAMPLE: THIRD PAGE OR LATER PAGES
* CACHE REGISTRATION IS NOT PERFORMED AND FIGURE DRAWING USING CACHE SEARCH IS PERFORMED

<PAGE PROCESSING IN INEFFECTIVE MODE>

EXAMPLE: SECOND PAGE OR LATER PAGES
* CACHE DOES NOT OPERATE

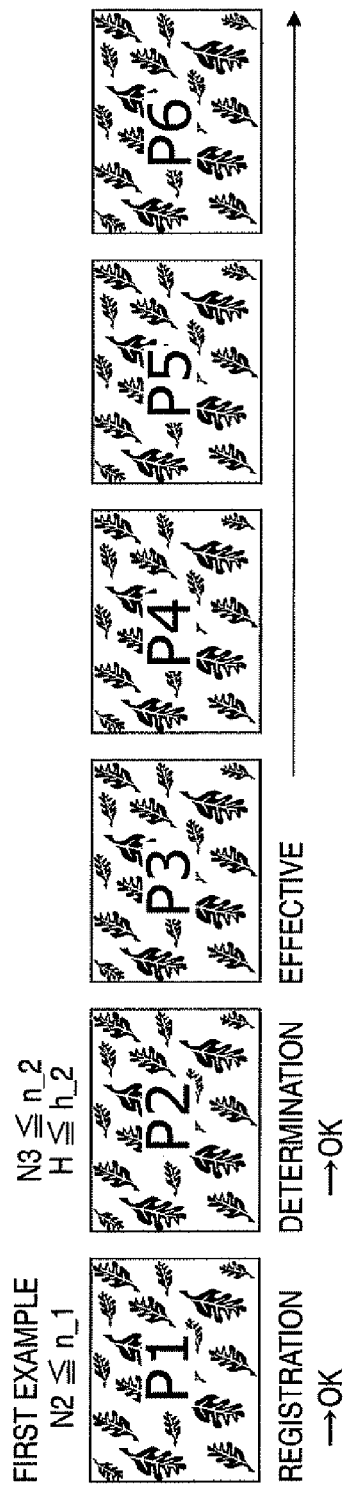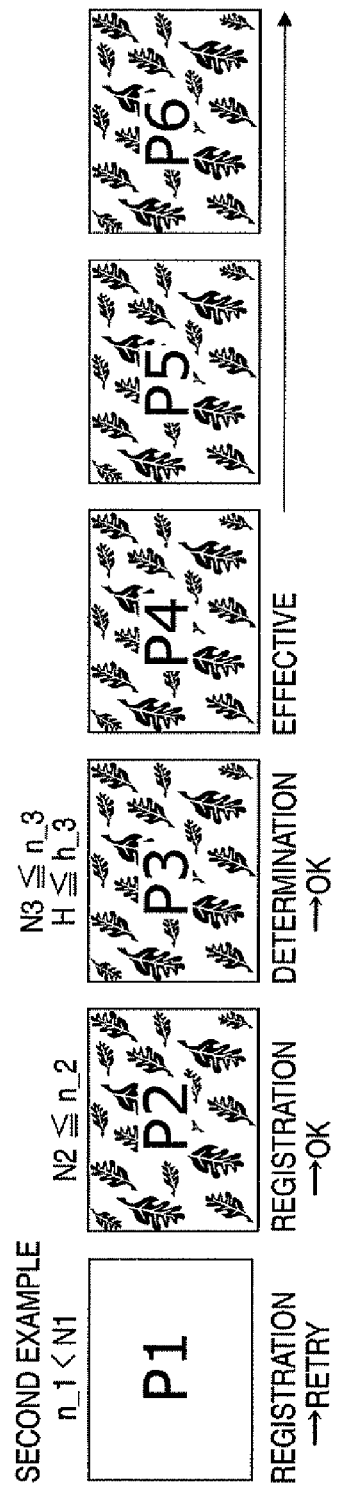

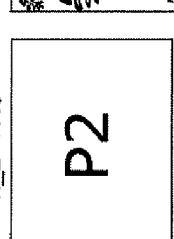
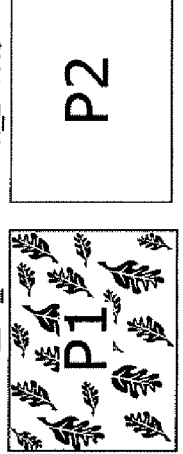
FIG. 7C  THIRD EXAMPLE
$N2 \leq n\_1$
REGISTRATION → OK
$n\_2 < N3$
DETERMINATION → HOLD
$N3 \leq n\_3$
$H \leq h\_3$
DETERMINATION → OK
EFFECTIVE
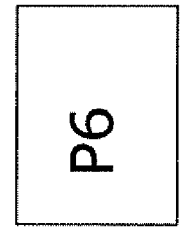
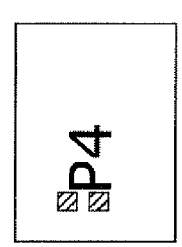
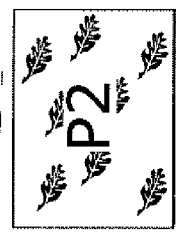
FIG. 7D  FOURTH EXAMPLE
$N2 \leq n\_1$
REGISTRATION → OK
$h\_2 < H$
$N3 \leq n\_2$
DETERMINATION → NG
INEFFECTIVE
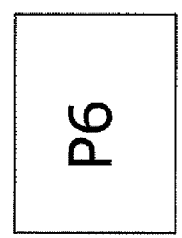
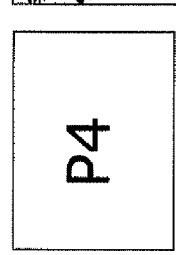
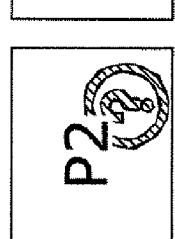
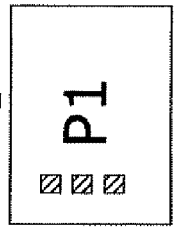
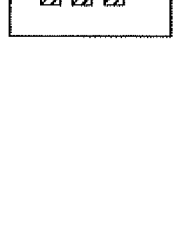
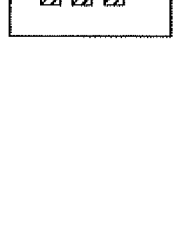
FIG. 7E  FIFTH EXAMPLE
$N2 \leq n\_1 < N2$
REGISTRATION → NG
INEFFECTIVE

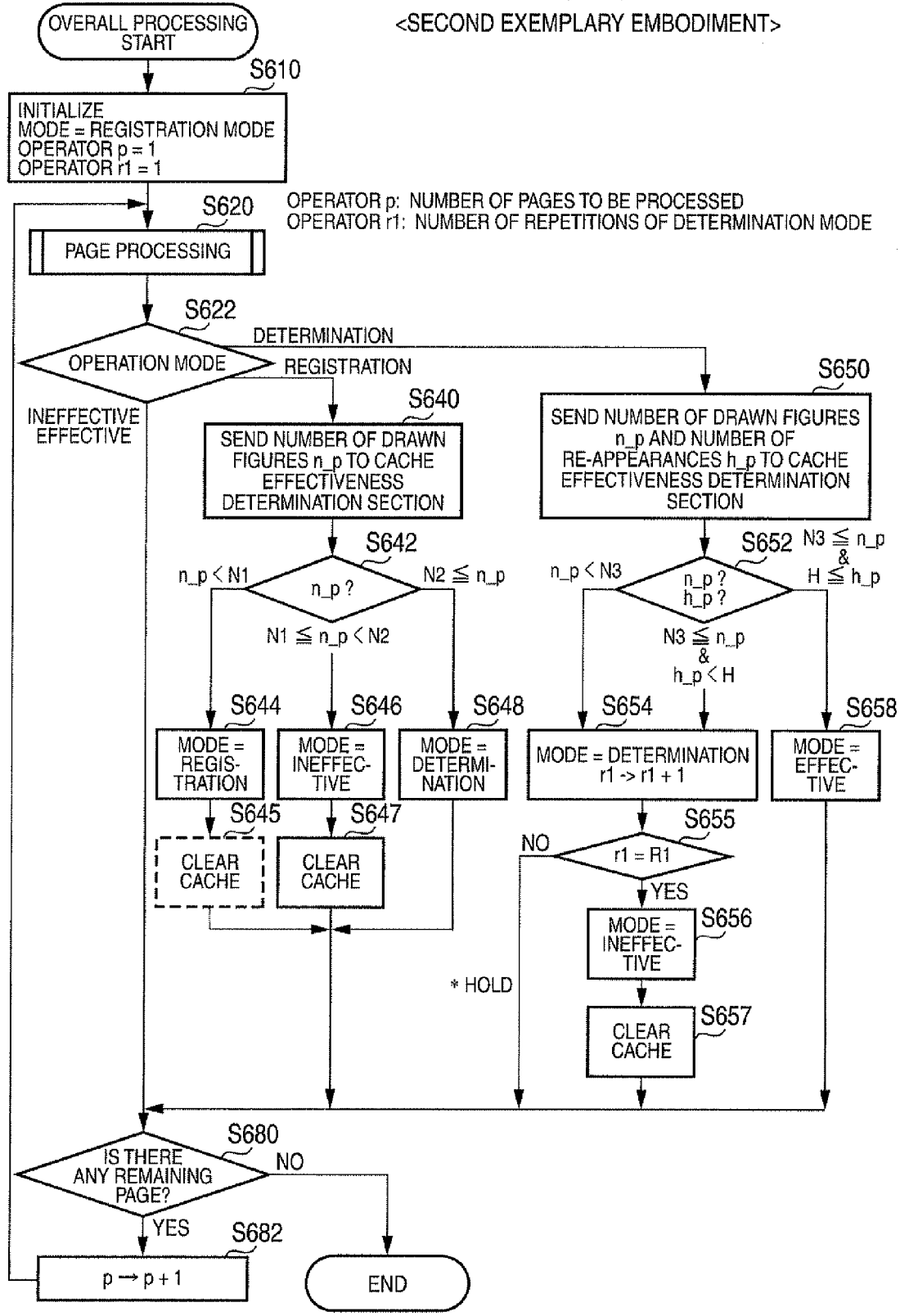

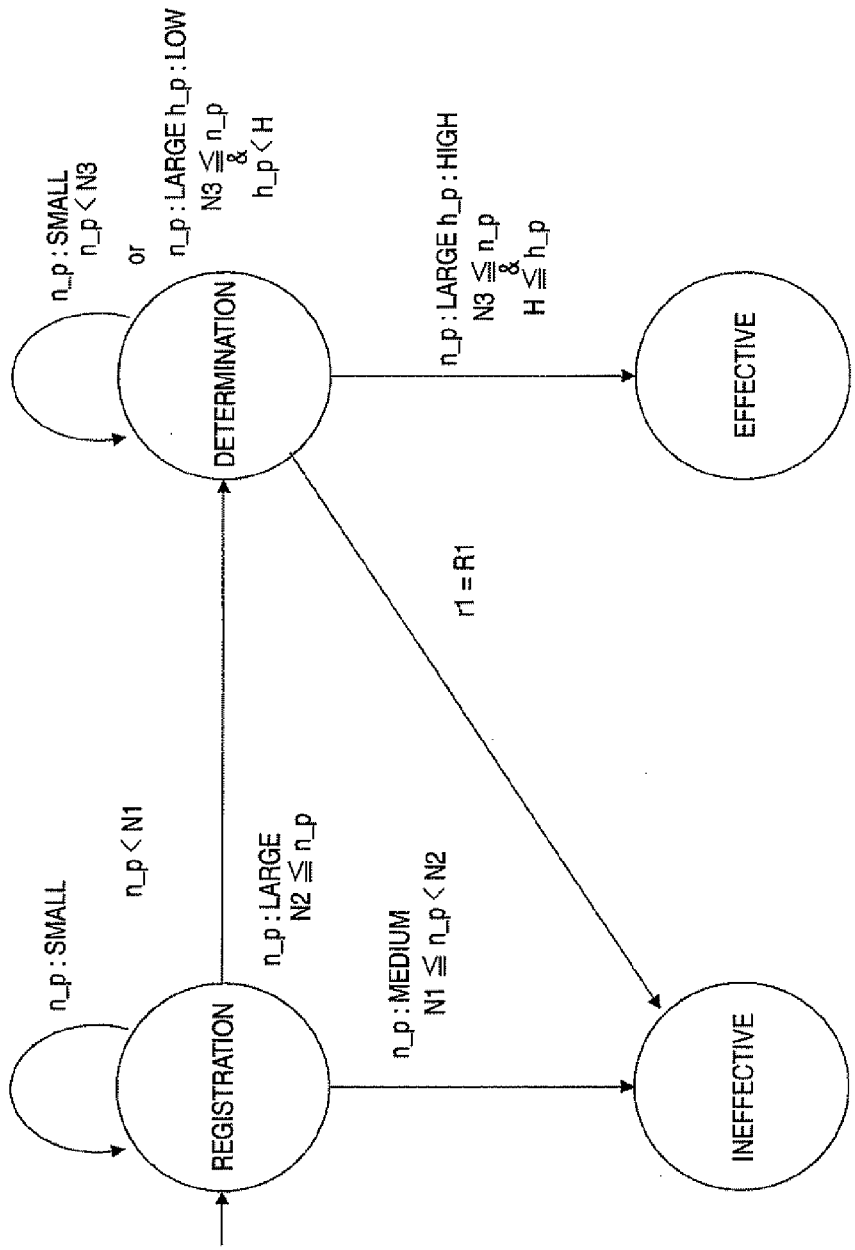

SECOND EXAMPLE
FIRST EXEMPLARY EMBODIMENT

SECOND EXEMPLARY EMBODIMENT @R1 = 5

FIG. 9E
THIRD EXAMPLE
FIRST EXEMPLARY EMBODIMENT
FIG. 9F
SECOND EXEMPLARY EMBODIMENT @R1 = 5
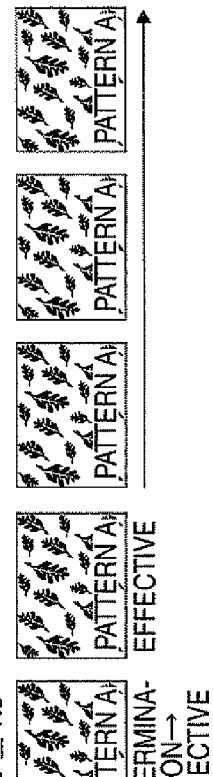

<THIRD EXEMPLARY EMBODIMENT: FIRST TECHNIQUE>

(CONT.)

(FIG. 10A Continued)
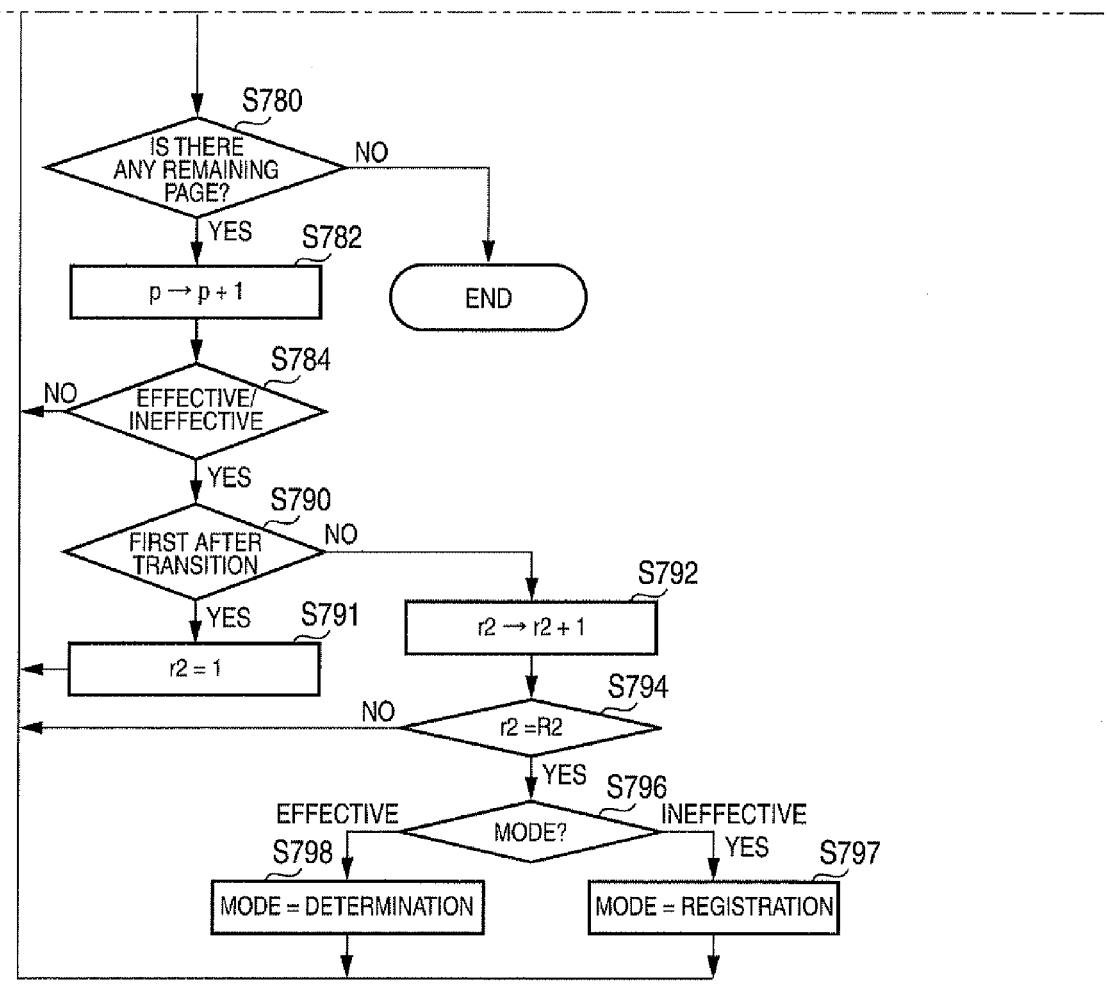

<THIRD EXEMPLARY EMBODIMENT: SECOND TECHNIQUE>

(CONT.)

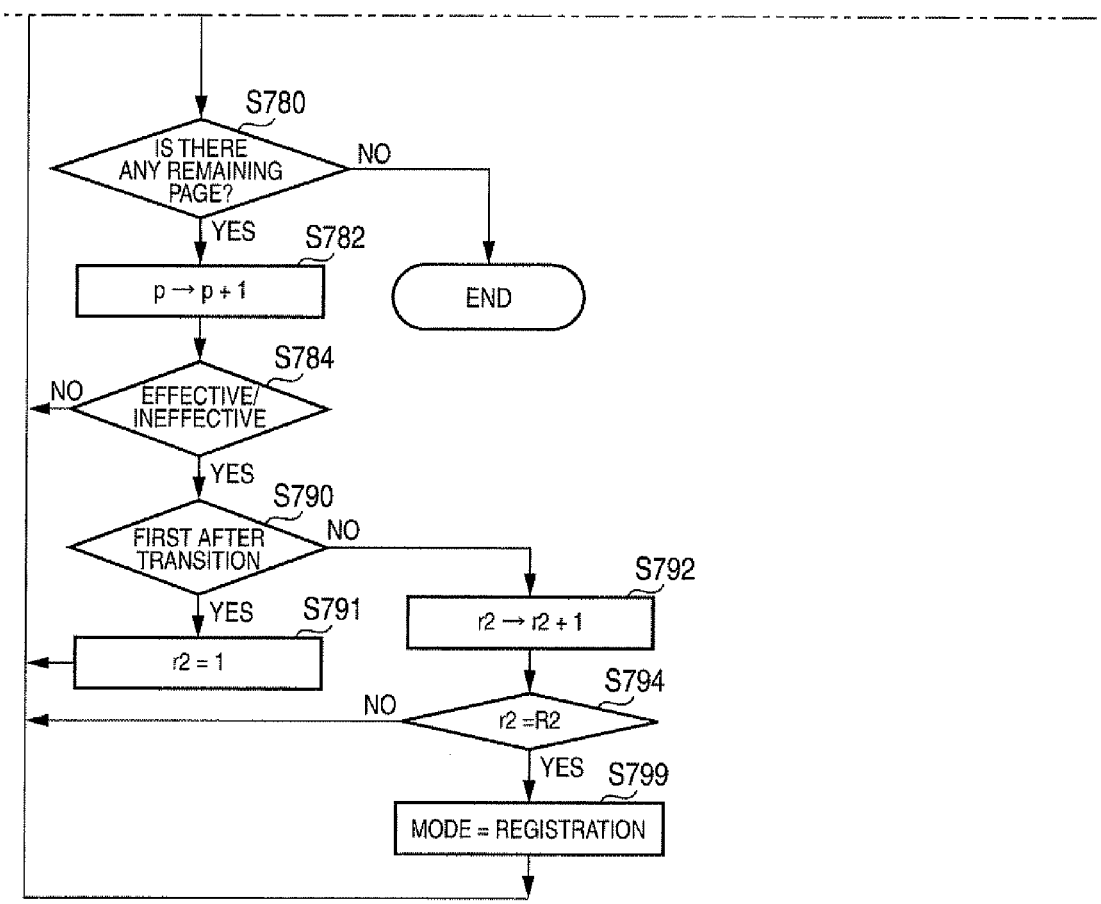

FIG. 11A

FIRST EXAMPLE
FIRST EXEMPLARY EMBODIMENT $N2 \leq n\_1$     $H \leq h\_2$
                $N2 \leq n\_2$

REGISTRA-   DETERMINA-   EFFECTIVE
TION→OK    TION→OK

FIG. 11B

THIRD EXEMPLARY EMBODIMENT @ R2 = 4

$N2 \leq n\_1$     $H \leq h\_2$    r2=1<R2    r2=2<R2    r2=3<R2    r2=4=R2    $h\_7 < H$
                $N3 \leq n\_2$                                                              $N3 \leq n\_7$ REGISTRA-  DETERMINA-  EFFECTIVE                         →TO DETER-     DETERMINA-  INEFFECTIVE
TION→OK   TION→OK                                              MINATION      TION→NG

SECOND EXAMPLE
FIRST EXEMPLARY EMBODIMENT

THIRD EXEMPLARY EMBODIMENT @ R2 = 4

THIRD EXAMPLE
FIRST EXEMPLARY EMBODIMENT

THIRD EXEMPLARY EMBODIMENT @R2 = 4

FOURTH EXAMPLE
FIRST EXEMPLARY EMBODIMENT

THIRD EXEMPLARY EMBODIMENT @R2=4

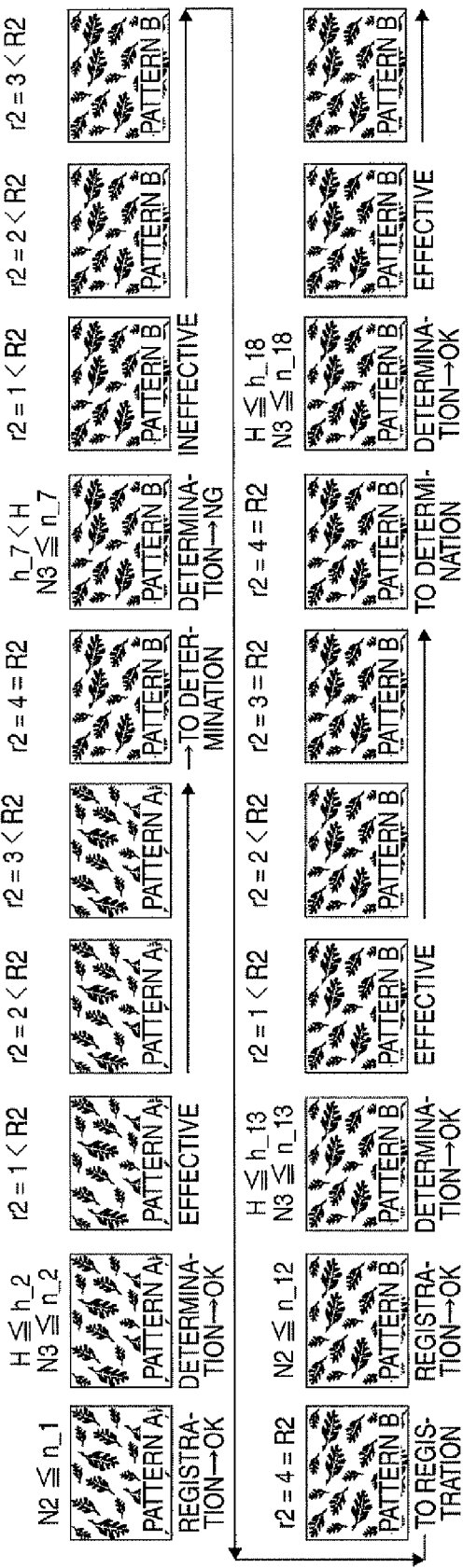

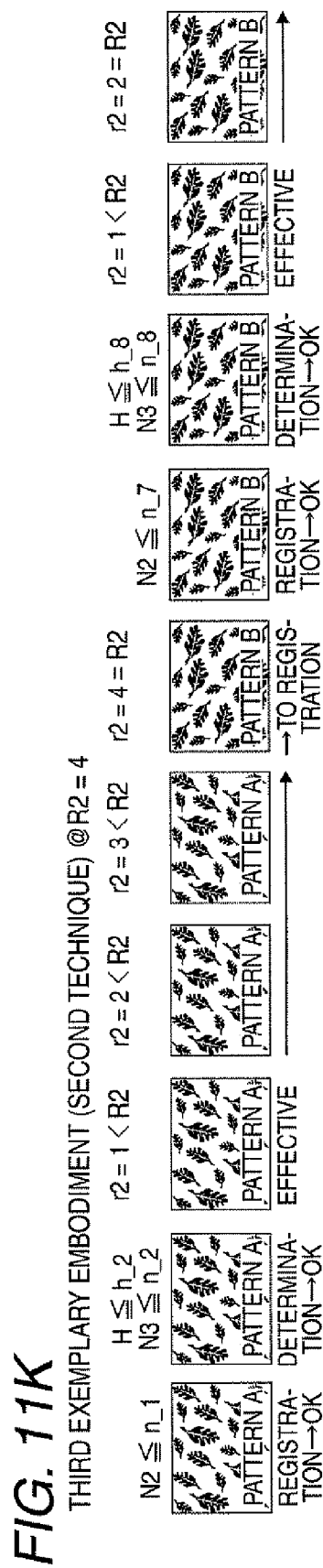

<FIRST MODIFIED EXAMPLE>

<SECOND MODIFIED EXAMPLE>

<THIRD MODIFIED EXAMPLE>

<FOURTH MODIFIED EXAMPLE>

DRAWING PROCESSING DEVICE, IMAGE OUTPUT APPARATUS, AND COMPUTER-READABLE MEDIUM

CROSS-REFERENCE TO RELATED APPLICATIONS

This application is based on and claims priority under 35 USC 119 from Japanese Patent Application No. 2009-67502 filed on Mar. 19, 2009.

BACKGROUND

1. Technical Field

The invention relates to a drawing processing device, an image output apparatus, and a computer-readable medium.

2. Related Art

A mechanism of drawing processing is used to print out with an image forming apparatus such as a printer or to display on an image display apparatus having a display device such as a CRT or an LCD (liquid crystal display) based on electronic data that is created using a document creation tool such as word-processing software, drawing creation software, etc., for example.

In output processing, usually, drawing processing (also called rendering or rasterizing) is performed for image data in accordance with output units (for example, one page or one screen) before the output processing. For example, a printer processes various drawing commands output from a document creation apparatus such as a personal computer and develops the drawing commands into image data being represented by arrangement of pixels that can be printed on the printer.

In the drawing processing, various types of processing responsive to the various drawing commands are performed from time when the drawing commands output from a host apparatus such as a document creation apparatus is received to time when the drawing commands are developed into image data being represented by arrangement of pixels that can be output on an image output apparatus.

SUMMARY

According to an aspect of the invention, a drawing processing device includes a rendering section, a first figure drawing section, a figure pattern registration section, a second figure drawing section and a function control section. The rendering section performs rendering based on a drawing command. The first figure drawing section draws a figure based on a figure pattern obtained by having the rendering section perform the rendering. When the rendering section performs the rendering for a figure, the figure pattern registration section registers the figure pattern for the figure therein. If a figure drawing command is received and if a figure pattern corresponding to the received figure drawing command is stored in the figure pattern registration section, the second figure drawing section selects the corresponding figure pattern registered in the figure pattern registration section and draws a figure in place of the first figure drawing section. Based on an appearance state of figures in a page to be processed, the function control section controls whether or not figure drawing performed by the second figure drawing section is caused to function in the page to be processed.

BRIEF DESCRIPTION OF THE DRAWINGS

Exemplary embodiments of the invention will be described in detail below based on the accompanying drawings, wherein:

FIG. 6A is a drawing to explain page processing in a registration mode;

FIG. 6B is a drawing to explain page processing in a determination mode;

FIG. 7A to 7E are drawings to explain mode transition examples according to the first exemplary embodiment of the invention;

FIG. 8A is a flowchart to explain a general processing procedure of rendering processing according to a second exemplary embodiment;

FIG. 8B is a transition diagram of an operation mode in the rendering processing according to the second exemplary embodiment;

FIGS. 9A to 9F are drawings to explain mode transition examples according to the second exemplary embodiment of the invention;

FIGS. 11A to 11K are drawings to explain mode transition examples according to the third exemplary embodiment of the invention;

DETAILED DESCRIPTION

Referring now to the accompanying drawings, exemplary embodiments of the invention will be described in detail.

<System Configuration>

Figure 1:
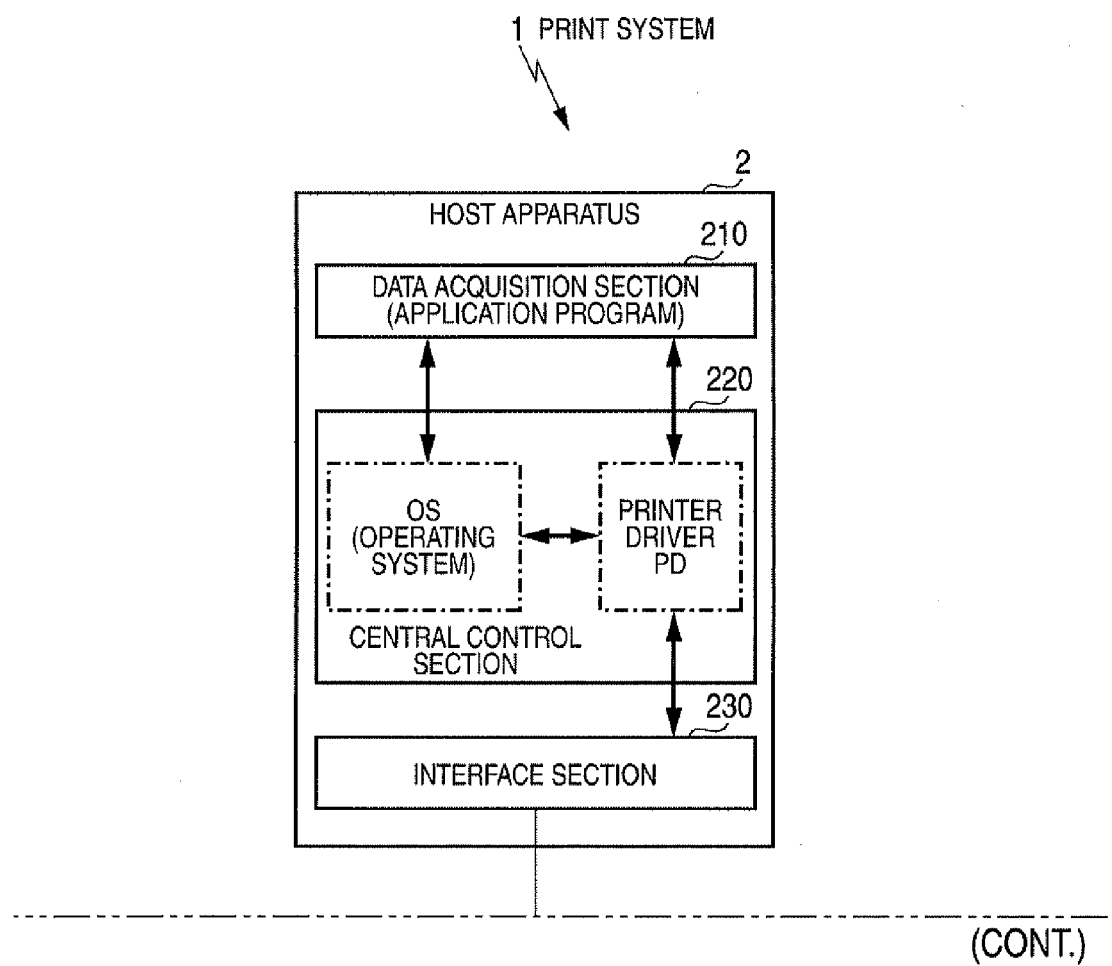
FIG. 1 is a drawing to show a configuration example of a print system.

FIG. 1 is a drawing to show a configuration example of a print system. A print system 1 according to this exemplary embodiment has a host apparatus 2 and a printing apparatus 3. The host apparatus 2 and the printing apparatus 3 are connected by a transmission line 9 which is an example of a communication line.

The host apparatus 2 creates and outputs document data containing figures; for example, a personal computer (PC) is used. The document data containing figures created by the host apparatus 2 is sent to the printing apparatus 3 as print data described in the PDL (Page Description Language) (PDL data). The PDL data is data for enabling images (photos, images), figures (graphics), text, etc., to be handled in a similar manner and enabling scale-up, rotation, deformation of figures, text etc., to be controlled as desired.

[Host Apparatus]

The host apparatus 2 has a data acquisition section 210 for generating image data of a document, figures, etc., a central control section 220 for controlling an operation of respective sections of the host apparatus 2, and an interface section 230 (IF section) for providing an interface function with the printing apparatus 3.

For example, an application program for generating data of a document, figures, etc., is installed in the data acquisition section 210. The data acquisition section 210 may acquire externally generated data for print out.

An operating system (OS) which is software for controlling the whole host apparatus 2 and a printer driver PD which is software for controlling the printing apparatus 3 are installed in the central control section 220.

Accordingly, the host apparatus 2 implements an apparatus for issuing a print command to the printing apparatus 3 in a software manner based on a program. That is, CD-ROM or the like that stores a program for constituting respective functional sections is provided, and the program is read from the CD-ROM and is installed in a hard disk drive, etc., (not shown). Then, the program is read from the hard disk drive, and a CPU (Central Processing Unit) or an MPU (Microprocessing Unit) (not shown) for implementing the central control section 220 executes a determined processing procedure, to thereby implement the functions in a software manner.

The operating system controls and manages the hardware, the various apparatuses and devices, and various software programs in the host apparatus 2. An application program operates under the control and management of the operating system OS. The application program outputs a print command of text, an image, etc. Here, it is assumed that the substance to print is output as drawing information that is written in the page description language.

For example, a drawing command having various command types such as an image drawing command, a graphic drawing command, and a font drawing command are input to the printer driver PD in sequence from the application program installed in the host apparatus 2.

The printer driver PD usually is provided in the printing apparatus 3 and is a program which is loaded into the host apparatus 2 and operates. The printer driver PD is usually used to allow the host apparatus 2 to handle various data formats expected to be used in the specific printing apparatus 3. Upon reception of drawing information from the application program, the printer driver PD executes various processing steps before transmitting to the printing apparatus 3. For example, the printer driver PD converts the drawing information received from the application program into a string of commands and drawing objects that can be interpreted by the printing apparatus 3 and transmits the string.

In this exemplary embodiment, the printer driver PD converts a drawing command into PDL data as a print command that can be understood by the printing apparatus 3, and outputs the PDL data to the interface section 230. The print command input to the interface section 230 is sent through the transmission line 9 (connection cable and network) to the printing apparatus 3, which then prints an image on a sheet of paper (outputs an image) in accordance with the received PDL data.

[Printing Apparatus]

The printing apparatus 3, which is an example of an image output apparatus, executes print processing based on the print data output from the host apparatus 2 (PDL data). The print data in the PDL includes a drawing command for representing an image, a figure, text at any position in a page, a command placing data in any desired order, and a data string. The printing apparatus 3 is a page printer and renders (performs drawing developing for) image data in output units (for each page) before print, and then outputs raster data to a printer engine section.

To implement such a function, the printing apparatus 3 includes a central arithmetic/control processing section 310, RAM 312 (Random Access Memory), an interface section 330, a PDL data interpretation section 340 (interpreter section), and a rendering processing section 350 which is an example of a drawing processing device. The printing apparatus 3 also includes a print control section 370 (output processing section), a printer engine section 380, an image processing section 382, a printer IF section 388, and a hard disk drive 390 (HDD).

The central arithmetic/control processing section 310 controls the whole printing apparatus 3. The interface section 330 provides an interface function with the host apparatus 2.

The PDL data interpretation section 340 is an example of a drawing command output device that interprets PDL data and passes an obtained drawing command to the rendering processing section 350. The PDL data interpretation section 340 recognizes acquired drawing information, an acquired command, an acquired drawing data string, etc., assembles them into a command and an argument, and interprets the command.

The rendering processing section 350 performs graphic drawing, text drawing, and/or image drawing based on the interpreted command received from the PDL data interpretation section 340, to thereby generate bit map data (raster data). At this time, the rendering processing section 350 once stores the generated data in a page memory area of the hard disk drive 390. For example, to execute color print, the rendering processing section 350 rasterizes the PDL data for respective colors, for example, for four planes of C (cyan), M (magenta), Y (yellow), and K (black), and stores the raster data for the respective planes in the page memory area of the hard disk drive 390 individually.

The print control section 370 controls print processing based on the bit map data resulting from the rendering performed by the rendering processing section 350. The printer engine section 380 executes print processing in accordance with a command of the print control section 370. The printer IF section 388 is provided between the printer engine section 380 and a system bus. The printer engine section 380 is an example of an image forming section (image output section) for forming an image on an output medium based on the data processed in the rendering processing section 350.

When print is performed, the print control section 370 activates the printer engine section 380 and supplies bit map data corresponding to an output unit to the printer engine section 380 through the printer IF section 388. The printer engine section 380 forms an image on a sheet of paper for output in accordance with the bit map data supplied through the printer IF section 388. That is, the printer engine section 380 actually forms an image on a record medium in accordance with the image data stored in the page memory area. As the printer engine section 380, any of various printing methods including a laser method, for example, may be adopted. At this time, the image processing section 382 may perform binarization processing or screen processing.

The hard disk drive 390 is an example of a nonvolatile storage medium and also functions as an example of a data storage section for not only storing the raster data generated by the rendering processing section 350, but also temporarily storing a drawing object obtained by interpretation/conversion of the PDL data interpretation section 340 and a drawing computation command (which may also collectively referred to as a drawing command).

[Rendering Processing Section]

The rendering processing section 350 has a figure appearance state counting section 352, a cache effectiveness determination section 354, a cache function control section 356, and a drawing execution section 360. The drawing execution section 360 has a rendering section 362, a character pattern registration section 364, a figure pattern registration section 365, a first drawing section 366, and a figure drawing section 368.

The figure appearance state counting section 352 counts the number of figures drawn by the rendering section 362. The cache effectiveness determination section 354 is an example of a threshold-value determination section that performs a threshold-value determination for a frequency at which the rendering section and the figure drawing section 368 perform figure drawing in a page to be processed. The figure pattern registration section 365 determines an operation mode for a next page based on the processing results of the figure appearance state counting section 352 and the cache effectiveness determination section 354 (which will be described in detail later).

The rendering section 362 performs drawing processing of each object, such as text, figure, and a photo, based on a drawing command from the PDL data interpretation section 340.

The character pattern registration section 364 stores the bit map information of a character once created by the rendering section 362 together with a character size and a character code of the character. The figure pattern registration section 365 stores the bit map information (figure pattern, figure pattern) of a figure once created by the rendering section 362 together with a figure code, etc.

The first drawing section 366 takes charge of drawing processing of text and drawing processing of a photo (image). The character pattern registration section 364 and the first drawing section 366 are function sections for implementing a cache function at the time of text drawing processing. That is, when a character pattern having a desired size is created from an outline character, the bit map information of the character once created by the rendering section 362 is registered in the character pattern registration section 364 together with the character size, the character code, etc., of the character. When it becomes necessary to again create the same character pattern, the same character pattern is searched for among the already registered character patterns. If the same character pattern exists, it is used as the result of cache processing.

The figure drawing section 368 is serves as a second drawing section in contrast with the first drawing section 366. The figure drawing section 368 operates in place of the first drawing section 366, and when the figure drawing section 368 is caused to function, the cache function control section 356 disables (turns off) the function of the first drawing section 366.

The figure pattern registration section 365 and the figure drawing section 368 are function sections for implementing the cache function at the time of figure drawing processing.

Storing (registering) a figure pattern in the figure pattern registration section 365 may also referred to as "storing in cache" or "registering in cache." The fact that a figure pattern corresponding to a figure to be processed is registered in the figure pattern registration section 365 may be referred to as "hitting a cache", and the fact that a figure pattern corresponding to a figure to be processed is not registered in the figure pattern registration section 365 may be referred to as "not hitting a cache."

<Principle of Improving Figure Drawing Processing>

Figure 2:
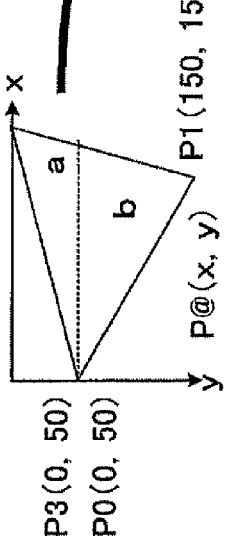
FIG. 2 is a drawing to explain figure drawing processing.

FIG. 2 is a drawing to explain the figure drawing processing. In order to speed up the figure drawing, it is considered that a cache function is applied as in the case of text drawing. However, for figures, a use frequency of the same pattern is low as compared with that for a character. Also, since the pattern sizes are various, figure cache processing is complicated as compared with character (text) cache processing. To hold many figure patterns, a memory having a large capacity would be required. It may take a long time to check if a certain figure pattern is registered. Therefore, it may frequently happen that the processing time shortening effect provided by the cache function is not sufficiently exerted.

For example, "Standard of Printer Evaluation Pattern J11/ Ver. 1: JEITA IT-3011" (Standard of Japan Electronics and Information Technology Industry Association) (hereinafter, which will be referred to as "JEITA IT-3011 test pattern") is a 12-page document of color presentation patterns in which many tables, graphs, figures, photographs (images) are used. JEITA IT-3011 test pattern is a document having a large amount of data. When "JEITA IT-3011 test pattern" is printed by applying the cache function for figure drawing described in JP Hei. 8-16801 A (corresponding to U.S. Pat. No. 5,963, 655), general path drawn figures less frequently uses the same pattern. Therefore, it takes time in cache search, and it cannot be said that this processing is efficient cache processing.

For example, FIG. 2 shows a cache example of a figure (graphic). The case in which a triangular figure is registered in a cache will be described in FIG. 2. A command "Move" meaning moving a control point to a specified coordinate value, a command "Line" meaning connecting by a straight line segment to a specified control point, and a command "Close" meaning connecting by a straight line segment to the path start point so as to close the path sequence are used as commands.

Here, as coordinates P@ (x, y) in x, y coordinates in FIG. 2 is used, and four coordinates P0, P1, P2, and P4 indicate a triangle. P0 and P3 are the same coordinates. When such a triangle pattern is registered in the cache, for example, information defining that the figure is drawn using straight lines in order of P0, P1, P2, and P3 is registered in the cache. In this case, Move (0, 50) is registered as information specifying the P0 coordinate point (0, 50), Line (150, 150) is registered as information specifying the straight line from P0 to P1, Line (200, 0) is registered as information specifying the straight line from P1 to P2, and Close (0, 5) Line (150, 150) is registered as information drawing a straight line from P2 to P3 for closing the figure. Similar commands may be used for any other polygon (for example, a trapezoid, a parallelogram, etc.,) that can be drawn using straight lines.

A clipped figure corresponding to a cache key always becomes a trapezoid. The term "trapezoid" mentioned here is a figure having horizontal upper and lower bases (parallel to the x axis) each having a length of 0 or more. Therefore, when the cash is hit, a figure is clipped up and down by the horizontal line passing through P0 (P3) and becomes two trapezoids (triangles). The first clipped figure matches an upper triangle a, and the second clipped figure matches a lower triangle b.

However, in the graphic cache function, a case of no hitting and a case of hitting would frequently occur. If the hit rate is low, fruitless search time is taken. In order to deal with this issue, for example, it is considered that a cache size is increased to raise the hit rate. However, this involves a difficulty in tightening memory for other functions.

To implement the cache function of figure drawing, in this exemplary embodiment, whether or not the cash processing can be used is controlled in accordance with the number of figure patterns registered in the figure pattern registration section 365, the number of figures in a page to be processed, a frequency at which the figure drawing section 368 performs figure drawing, and the like. Thereby, the impact of a change in figure appearance state on an output processing speed is mitigated.

The figure appearance state is determined, and if it is found that the cache function is not effective, the cache function is turned off. Also, in figure drawing, figure drawing processing using a cache search is performed efficiently and high-speed drawing processing can be performed, and in addition, the impact of the figure appearance state (preferably, a difference in figure appearance state between pages) on an output processing speed is mitigated.

To determine the figure appearance state, a frequency at which the rendering section 362 and the figure drawing section 368 perform figure drawing in a page to be processed is determined according to a threshold value. Examples of the figure drawing frequency include the number of drawn figures in a page to be processed, the number of re-appearances (the number of hits) in a page to be processed, and the re-appearance rate (hit rate) in a page to be processed.

To implement the cache function of the figure drawing according to this exemplary embodiment, four modes of "registration", "determination", "ineffective", and "effective" are provided for an operation of the cache function, and the operation mode is switched dynamically for each page. Hereinafter, executing of figure drawing processing by having the figure drawing section 368 to search a cache of the figure pattern registration section 365 will be referred to as "figure drawing using a cache search". In this connection, it is needless to say that, for a figure which is not hit when a cache is searched, the rendering section 362 executes figure drawing processing.

At the time of drawing processing of a page for which the "registration mode" is adopted, a figure pattern obtained by having the rendering section 362 to perform rendering is registered in the figure pattern registration section 365. That is, the figure pattern is registered in the cache. At the time of the drawing processing of a page for which the registration mode is adopted, the figure drawing section 368 does not perform the figure drawing using the cache search, and the rendering section 362 performs drawing processing of all figures.

At the time of the drawing processing time of a page for which the "determination mode" is adopted, a figure pattern is not registered in the cache of the figure pattern registration section 365, and the rendering processing section 350 executes the figure drawing using the cache search. At this time, in order to determine as to whether or not the cache function is effective for a document, the figure appearance state counting section 352 and the cache effectiveness determination section 354 operate in conjunction with each other to count a re-appearance rate (hit rate) of the same pattern (figure) and the number of drawn patterns (figures) (which also referred to as the number of registered paths) and make a threshold-value determination. Then, based on the determination result, the cache function control section 356 determines an operation mode for a next page.

In the "determination mode," it is prohibited that a new pattern (figure) is registered in the cache. Thereby, even if the "determination mode" is repeated, degradation of an accuracy of a determination as to whether or not the same figure graphic background can be used, that is, degradation of an accuracy of threshold-value determination processing for controlling, in response to a pattern (figure) appearance situation, whether or not the cache function can be used is prevented. The situation in which patterns (figures) which are not a graphic background are gradually added to the cache, a count of matching it increases, and $H \leq h\_p$ is satisfied although the same graphic background does not exist is excluded.

At the time of the drawing processing of a page for which the "effective mode" is adopted, a figure pattern is not registered in the cache of the figure pattern registration section 365, and the rendering processing section 350 executes the figure drawing using the cache search. Under the "effective mode," the cache function control section 356 prohibits the figure appearance state counting section 352 and the cache effectiveness determination section 354 from performing the threshold-value determination processing, to thereby omit overhead and attempt to increase the processing speed.

At the time of the drawing processing of a page for which the "ineffective mode" is adopted, cache data which has already been registered in the figure pattern registration section 365 is erased (cleared), and a figure pattern is not registered in the cache of the figure pattern registration section 365. Further, the figure drawing section 368 does not execute the figure drawing using the cache search, and the rendering section 362 executes figure drawing processing.

In the "effective mode" and the "ineffective mode," the cache registration of a new pattern (figure) is prohibited, and fruitless cache registration processing is left out for shortening the processing time.

Depending on a document or a processing mode, any of the "determination mode," the "effective mode," and the "ineffective mode" may continue. To deal with this situation, the number of continued pages may be monitored, and when it reaches a given threshold value, the continued mode (function state) may be released, and the mode may be changed to another mode. The number of continued pages in the "determination mode," the "effective mode," or the "ineffective mode" may be monitored, and when it reaches a given threshold value, the mode may be changed to the "registration mode", and re-registration may be performed after already registered data is deleted.

Rendering Processing

First Exemplary Embodiment

Rendering processing according to the first exemplary embodiment will be described below: In the rendering processing according to the first exemplary embodiment, an appearance state of figures in a next page is predicted based on an appearance state of figures between two pages, and the operation mode is switched. Also, in the "registration mode", preliminary determination processing is performed prior to the "determination mode". Also, after the "effective mode" or the "ineffective mode" is set, processing of the remaining pages is performed with the same mode being maintained, unlike rendering processing according to a second exemplary embodiment which will be described later.

The "preliminary determination processing" determines if the "registration mode" is maintained and if the operation mode is changed to the "ineffective mode" or the "determination mode." If the cache function control section 356 cannot determine that the operation mode should be changed to the "ineffective mode" or the "determination mode," the cache function control section 356 maintains the "registration mode". If the cache function control section 356 has acquired sufficient information conducive to determination in the "determination mode," the cache function control section 356 switches the operation mode to the "determination mode". If the cache function control section 356 can determine, only based on a page to be processed, that a document is one for which the figure drawing cache function is not effective, the cache function control section 356 switches the operation mode to the "ineffective mode." A specific description will be given below.

[General Operation]

Figure 3A:
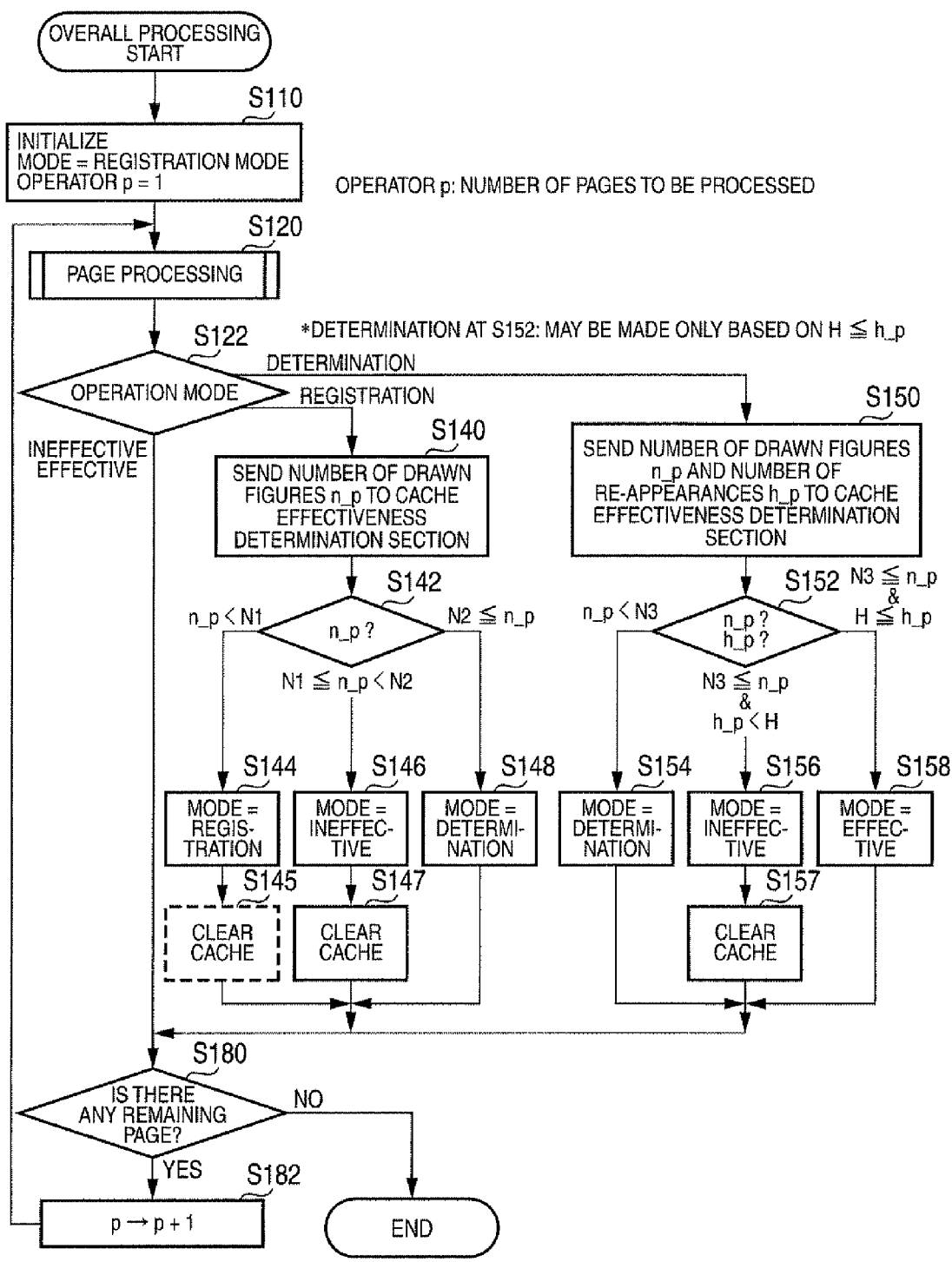
FIG. 3A is a flowchart to explain a general processing procedure of rendering processing according to a first exemplary embodiment of the invention.
Figure 3B:
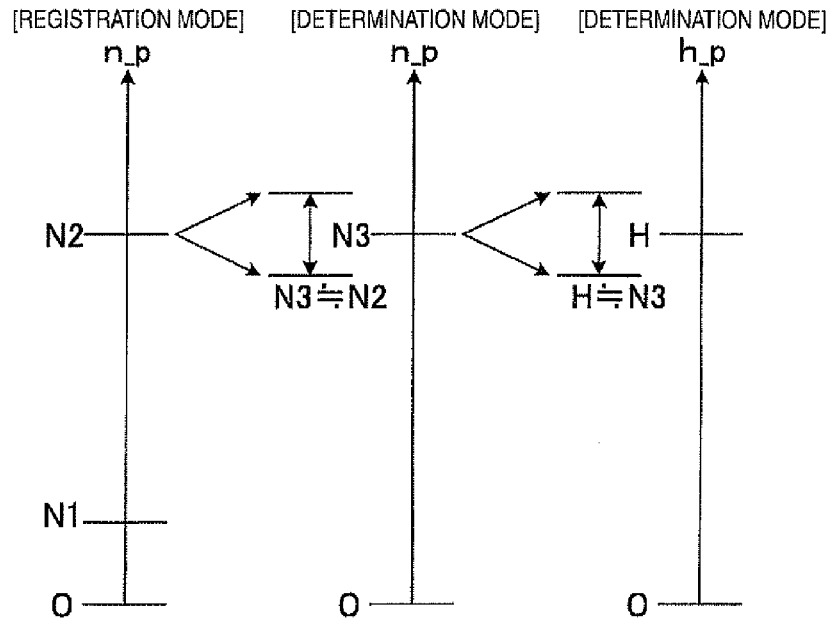
FIG. 3B is a drawing to explain a relationship between a count value and a determination threshold value in the rendering processing according to the first exemplary embodiment of the invention.
Figure 3C:
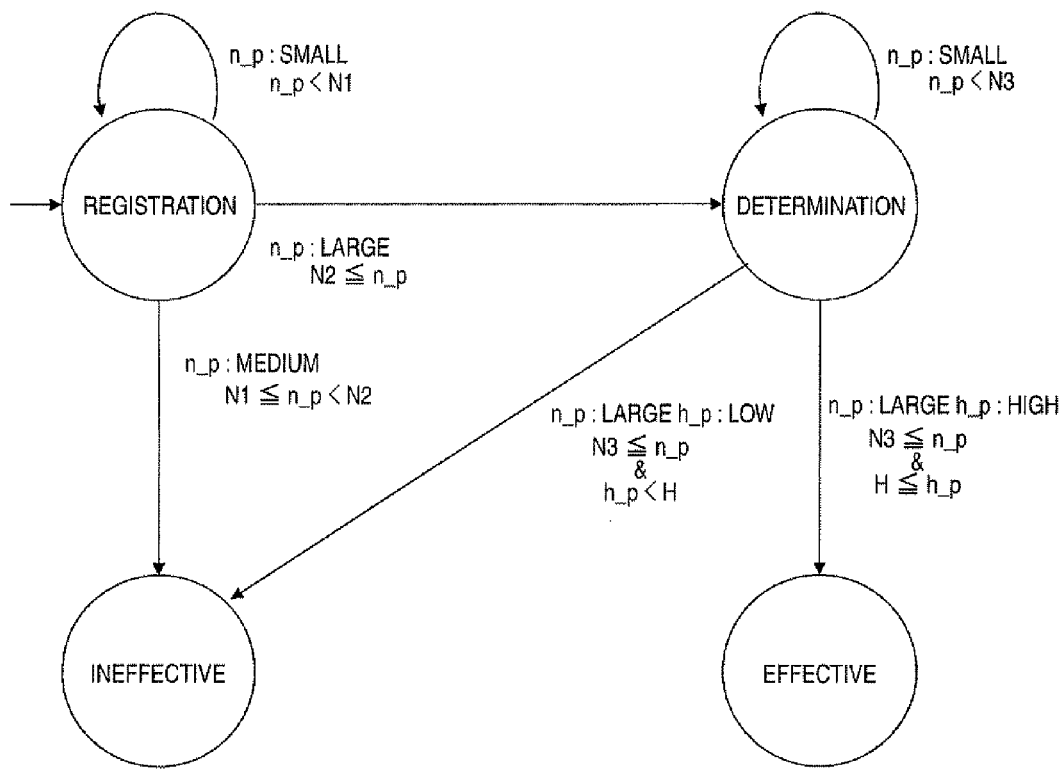
FIG. 3C is a transition diagram of an operation mode in the rendering processing according to the first exemplary embodiment of the invention.

FIGS. 3A to 3C are drawings to explain describe overall processing of the rendering processing according to the first exemplary embodiment. FIG. 3A is a flowchart to explain a overall processing procedure of the rendering processing according to the first exemplary embodiment. FIG. 3B is a drawing to explain a relationship between a count value and a determination threshold value in the rendering processing according to the first exemplary embodiment. FIG. 3C is a transition diagram of the operation mode in the rendering processing according to the first exemplary embodiment.

When document output processing is started, at the time of processing the initial page (first page), the cache function control section 356 initializes the operation mode of the cache function involved in the figure drawing to the "registration mode", and sets an operator p for a page to be processed to 1 (S110).

Then, for the page p to be processed, the rendering processing section 350 executes page processing in any of the four modes of registration, determination, ineffective, and effective which is set by the cache function control section 356 (S120).

If the page processing is completed in the "registration mode" (registration at S122), the cache function control section 356 performs the "preliminary determination processing" for determining an operation mode of a next page based on the processing results of the figure appearance state counting section 352 and the cache effectiveness determination section 354.

When the page processing is entered in the "registration mode," the rendering processing section 350 registers all input figures in the cache. That is, the rendering processing section 350 registers figure patterns, which are obtained by having the rendering section 362 to perform rendering, in the figure pattern registration section 365.

In this process, the figure appearance state counting section 352 counts the number of input figures in the page p to be processed (in other words, the number of figures drawn by the rendering section 362 n_p) and sends this information to the cache effectiveness determination section 354.

The cache effectiveness determination section 354 performs the threshold-value determination for the number of drawn figures n_p and sends the determination result to the cache function control section 356 (S142). In the threshold-value determination processing in the "registration mode" (S142), two determination threshold values N1 and N2 (N1<N2) are used to make a three-value determination for classifying the number of drawn figures n_p into three categories (large, medium, and small).

The cache function control section 356 determines, based on this comparison result, as to whether or not a document is one for which the figure drawing cache function is effective, and sets an operation mode of a next page. For example, if the number of drawn figures n_p falls below the determination threshold value N1 (S142—n_p<N1), the cache function control section 356 maintains (holds) the "registration mode" in processing of a next page (S144). In the determination as to "whether or not a document is one for which the figure drawing cache function is effective," if the number of drawn figures n_p is too small, it cannot be determined the operation mode should be change to the "ineffective mode" or the "determination mode". Therefore, the "registration mode" is maintained.

At this time, the cache function control section 356 may additionally register figure patterns in the next page in the figure pattern registration section 365. Alternatively, the cache function control section 356 may delete the cache data, which have already been registered in the figure pattern registration section 365, (S145) as indicated by the dotted line and then may execute the cache registration in a next page, that is, may perform the cache registration for each page.

If the number of drawn figures n_p falls below the determination threshold value N2 and is equal to or larger than the determination threshold value N1 (N1≦n_p<N2 at S142), the cache function control section 356 sets the operation mode of the next and subsequent pages to the "ineffective mode" (S146). The number of figure patterns registered in the cache is halfway, and it can be determined, only based on the page to be processed, that a document is one for which the figure drawing cache function is not effective. Therefore, the next and subsequent pages are processed in the "ineffective mode." At this time, the cache function control section 356 deletes the cache data, which have already been registered in the figure pattern registration section 365 (S147).

If the number of drawn figures n_p is equal to or larger than the determination threshold value N2 (S142—N2≦n_p), the cache function control section 356 sets an operation mode of a next page to the "determination mode" (S148). Since information conducive to determination in the "determination mode" is sufficiently acquired, processing of the next page is performed in the "determination mode."

If the page processing is completed in the "determination mode" (determination at S122), the cache function control section 356 determines an operation mode of a next page based on the processing results of the figure appearance state counting section 352 and the cache effectiveness determination section 354.

When the page processing is entered in the "determination mode," the rendering processing section 350 executes the figure drawing processing by having the figure drawing section 368 to search the cache of the figure pattern registration section 365.

In this process, the figure appearance state counting section 352 counts the number of re-appearances of the same figure h_p and the number of input figures (in other words, the number of all figures drawn by the rendering section 362 and the figure drawing section 368 n_p) and sends them to the cache effectiveness determination section 354 (S150). The re-appearance rate may be used in place of the number of re-appearances h_p.

The cache effectiveness determination section 354 performs a threshold-value determination for the number of drawn figures n_p in the page p to be processed and also performs a threshold-value determination for the number of re-appearances h_p, and sends the results to the cache function control section 356 (S152).

In the threshold-value determination processing for the number of drawn figures n_p in the "determination mode" of the first exemplary embodiment (S152), one determination threshold value (determination threshold value N3) is used to make a two-value determination for classifying the number of drawn figures n_p into two categories (large and small). In the threshold-value determination processing for the number of re-appearances h_p (S152), one determination threshold value (determination threshold value H) is used to make a two-value determination for classifying the number of re-appearances h_p into two categories (large and small). The determination threshold value H is used to determine as to whether or not the same figure for making it possible to determine that cache search effectively functions exists between pages. For example, it is considered that the determination threshold value H is set to approximately the same value as the determination threshold value N3 or is adjusted so as to conform to the actual condition with the value N3 being used as a center. This means that the determination threshold value H is set to a value considering the number of figures making up the graphic background. When the re-appearance rate h_p1 (=h_p/n_p) is used in place of the number of re-appearances h_p, the determination threshold value H is also defined in terms of "rate."

The cache function control section 356 determines, based on the comparison results, as to whether or not a document is one for which the figure drawing cache function is effective, and sets an operation mode of a next page. For example, if the number of drawn figures n_p falls below the determination threshold value N3 (S152—n_p<N3), the cache function control section 356 maintains (holds) the "determination mode" in processing of a next page (S154).

The determination threshold value N3 in the first exemplary embodiment has a similar meaning to the determination threshold value N2. The determination threshold value N3 may be approximately the same value as the determination threshold value N2 and need not necessarily be the identical value. When it is determined as to "whether or not a document is one for which the figure drawing cache function is effective," if the number of drawn figures n_p is small, it cannot be determined that the operation mode should be changed to the "ineffective mode" or the "effective mode". Thus, the "determination mode" is maintained.

In this connection, in the first exemplary embodiment, if this situation (n_p<N3) is repeated in the next and subsequent pages, the "determination mode" is continuously maintained. In the "determination mode," the figure drawing using the cache search is executed. If the number of drawn figures n_p is extremely small (n_p<N1), the number of cache searches is small, and thus it is considered that no serious problem arises. However, if the number of drawn figures n_p is medium (N1≦n_p<N3), it might take a considerable time to perform the cache search, which searches for a figure pattern matching any of the figure patterns registered in the "registration mode".

If the number of drawn figures n_p is equal to or larger than the determination threshold value N3 and if the number of re-appearances h_p falls below the determination threshold value H (N3≦n_p and h_p<H at S152), the cache function control section 356 sets the operation mode of the next and subsequent pages to the "ineffective mode" (S156). At this time, the cache function control section 356 deletes the cache data, which have already been registered in the figure pattern registration section 365 (S157). The hit rate is low although the number of figures in the page p to be processed is sufficiently large. Therefore, it can be determined that a document is one for which the figure drawing cache function is not effective. Thus, the next and subsequent pages are processed in the "ineffective mode."

In this exemplary embodiment, at step S152, the condition to set the operation mode to the "effective mode" is "N3≦n_p" and "H≦h_p". However, these conditions are not essential. The condition to set the operation mode to the "effective mode" may only include "H≦h_p". That is, at step S152, at least threshold-value determination processing for the number of re-appearances h_p may be performed.

If the number of drawn figures n_p is equal to or larger than the determination threshold value N3 and the number of re-appearances h_p is equal to or larger than the determination threshold value H (N3≦n_p and H≦h_p at S152), the cache function control section 356 sets an operation mode of a next page to the "effective mode" (S158). The number of figures in the page p to be processed is sufficiently large, and the hit rate is high. Therefore, it can be determined that a document is one for which the figure drawing cache function is effective. Thus, the next and subsequent pages are processed in the "effective mode."

When the threshold-value determination processing and the operation mode setting processing in the "registration mode" or the "determination mode" are completed, the rendering processing section 350 checks as to whether or not a remaining page exists (S180). If there is a remaining page (Yes at S180), the operator p of the page to be processed is incremented by one (S182), and the process returns to the page processing (S120). Then, processing of the next page is executed in the setup mode.

If the "ineffective mode" or the "effective mode" is set (ineffective at S122, effective at S122, N1≦n_p<N2 at S142, N3≦n_p and h_p≦H at S152, N3≦n_p and H≦h_p at S152), the rendering processing section 350 checks as to whether or not a remaining page exists (S180). If a remaining page exists (Yes at S180), the same operation mode is maintained, and the process returns to the page processing (S120). Then, processing of the remaining page is repeated.

Thus, once the "effective mode" is entered, figure patterns (including figure patterns in the remaining pages) are not registered in the cache of the figure pattern registration section 365, and the figure drawing section 368 performs the figure drawings by searching the cache. The operation mode is not switched to any other mode.

Also, once the "ineffective mode" is entered, figure patterns (including figure patterns in the remaining pages) are not registered in the cache of the figure pattern registration section 365, the figure drawing section 368 does not perform the figure drawing using the cache search, and the rendering section 362 performs the figure drawing processing. The operation mode is not switched to any other mode.

[Page Processing]

Figure 4:
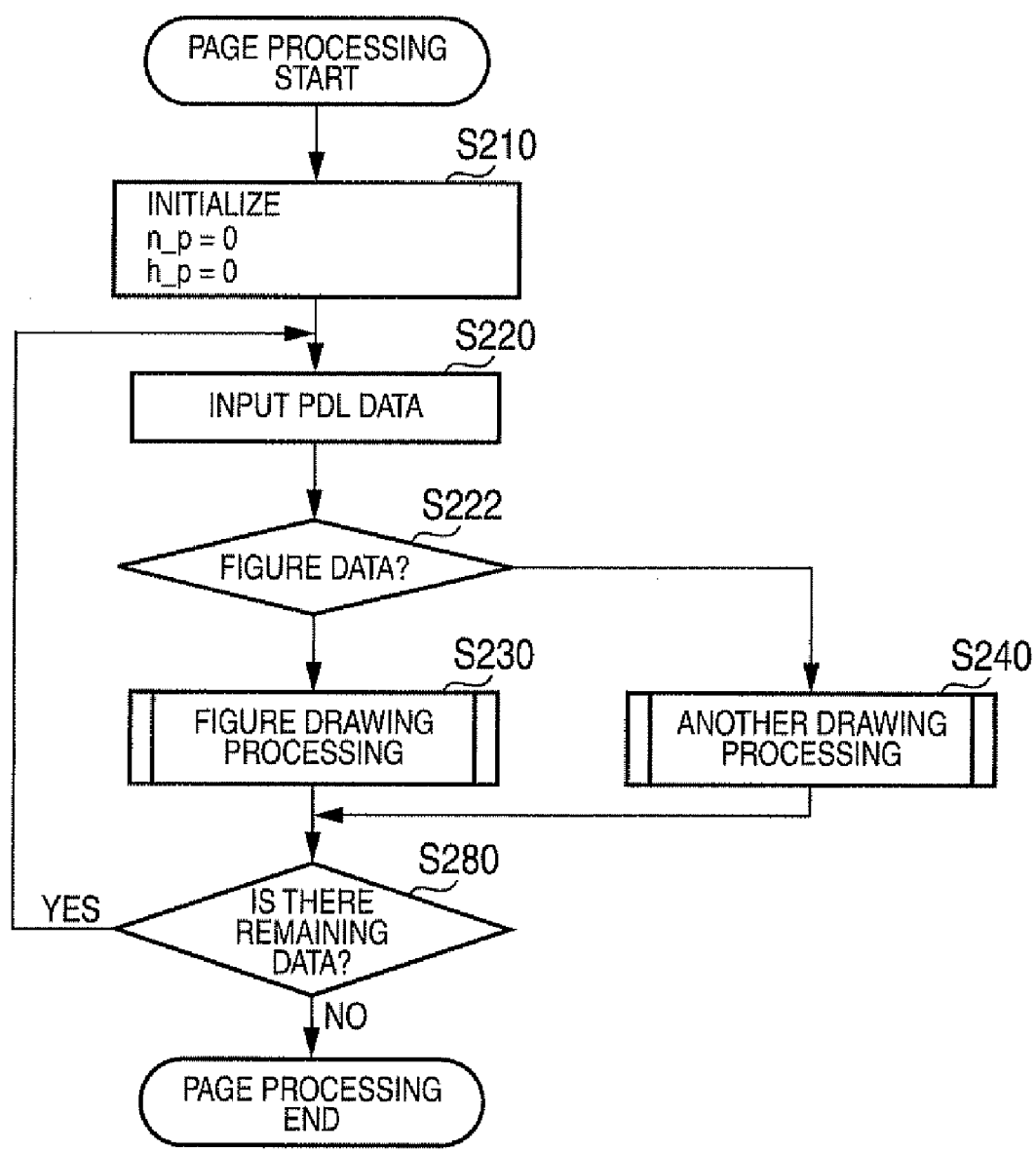
FIG. 4 is a flowchart to explain a detailed processing procedure of page processing (S120)

FIG. 4 is a flowchart to explain a processing procedure of the page processing (S120) in detail.

When the page processing is entered, the rendering processing section 350 (the figure appearance state counting section 352) first initializes the number of drawn figures n_p and the number of re-appearances h_p to 0 (S210).

The PDL data interpretation section 340 receives PDL data (S220) and passes a drawing command obtained by interpreting the PDL data to the rendering processing section 350. The rendering processing section 350 generates bit map data based on the drawing command.

At this time, the rendering processing section 350 determines as to whether or not the drawing command is figure data (figure drawing command) (S222). If the drawing command is figure data (figure drawing command) (YES at S222), the rendering processing section 350 performs the figure drawing processing (S230).

If the drawing command is not figure data (figure drawing command) (NO at S222), the rendering processing section 350 performs another drawing processing (S240). For example, if the drawing command is text data (character drawing command), bit map information once created by the rendering section 362 is registered in the character pattern registration section 364 together with a character size, a character code, etc., of a character. When it becomes necessary to again create the same character pattern, a search is made for the same character pattern among the already registered character patterns. If the same character pattern exists, cache processing using the character pattern is performed. If the drawing command is photo (image) data (photo drawing command), the rendering section 362 performs the rendering.

Upon completion of the drawing processing (S230, S240), the rendering processing section 350 checks as to whether or not remaining data exists (S280). If remaining data exists (YES at S280), the process returns to the PDL data input processing (S220), and processing of the page being processed p is completed.

[Figure Drawing Processing]

Figure 5:
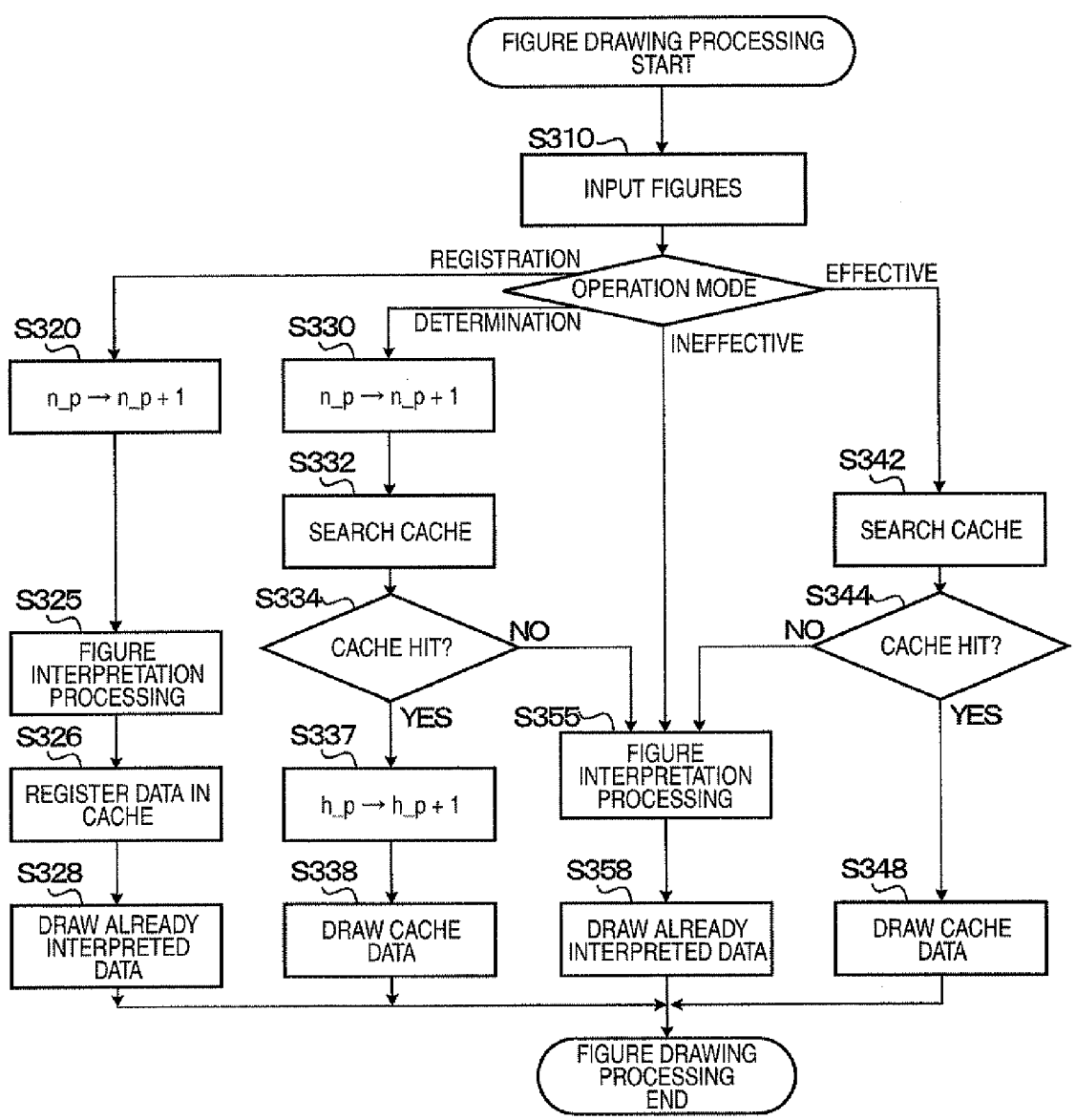
FIG. 5 is a flowchart to explain a detailed processing procedure of figure drawing processing (S230)

FIG. 5 is a flowchart to explain a processing procedure of the figure drawing processing (S230) in detail.

When the figure drawing processing is entered, the rendering processing section 350 first inputs figure data (figure drawing command) (S310). The rendering processing section 350 executes drawing processing in accordance with the operation mode set for the page p to be processed (S318).

For example, at the time of the drawing processing of a page for which the "registration mode" is adopted (registration at S318), the figure appearance state counting section 352 increments n_p by one to count the number of drawn figures n_p (S320). Then, the rendering section 362 executes figure interpretation processing (S325) and registers a figure pattern in the figure pattern registration section 365 (S326). The rendering processing section 350 executes the figure drawing in accordance with the interpreted command (S328).

At the time of the drawing processing of a page for which the "determination mode" is adopted (determination at S318), the figure appearance state counting section 352 increments n_p by one to count the number of drawn figures n_p (S330). Then, the rendering processing section 350 executes the figure drawing using the cache search (S332). If the cache search provides a hit, namely, if a figure pattern of a figure to be processed is already registered in the figure pattern registration section 365 (YES at S334), the figure appearance state counting section 352 increments h_p by one to count the number of re-appearances h_p (S337). Then, the figure drawing section 368 reads the corresponding figure pattern from the figure pattern registration section 365 and performs the figure drawing (S338). If the cache search provides no, namely, if a figure pattern of a figure to be processed is not registered in the figure pattern registration section 365 (NO at S334), the rendering section 362 executes the figure drawing processing as in the ineffective mode.

At the time of the drawing processing of a page for which the "effective mode" is adopted (effective at S318), a figure pattern is not registered in the cache of the figure pattern registration section 365, and the rendering processing section 350 executes the figure drawing using the cache search (S342). If the cache search provides a hit, namely, if a figure pattern of a figure to be processed is already registered in the figure pattern registration section 365 (YES at S344), the figure drawing section 368 reads the corresponding figure pattern from the figure pattern registration section 365 and performs the figure drawing (S348). If the cache search provides no hit, namely, if a figure pattern of a figure to be processed is not registered in the figure pattern registration section 365 (NO at S344), the rendering section 362 executes the figure drawing processing as in the ineffective mode.

At the time of the drawing processing of a page for which the "ineffective mode" is adopted (ineffective at S318), the rendering section 362 executes the figure interpretation processing (S355) and executes the figure drawing in accordance with the interpreted command (S358). At this time, a figure pattern is not registered in the cache of the figure pattern registration section 365.

Specific Example of First Exemplary Embodiment

Figure 6C:
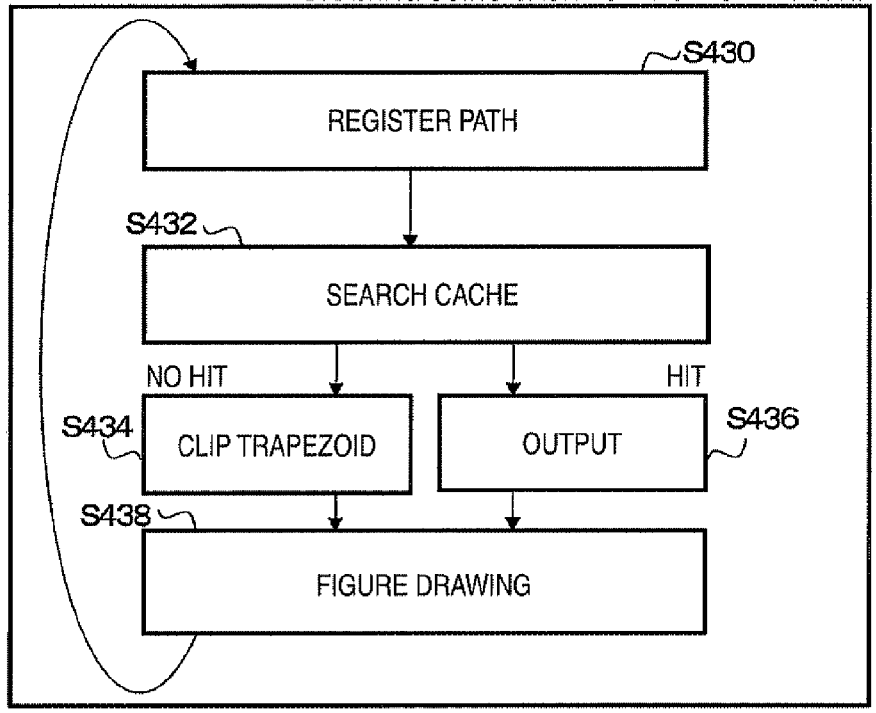
FIG. 6C is a drawing to explain processing in a page where an effective mode is determined.

FIGS. 6A to 7E are drawings to explain specific examples of the figure drawing processing according to the first exemplary embodiment. FIG. 6A is a drawing to explain page processing in the registration mode. FIG. 6B is a drawing to explain page processing in the determination mode. FIG. 6C is a drawing to explain processing in a page where the effective mode is determined. FIG. 6D is a drawing to explain processing in a page where the ineffective mode is determined. FIGS. 7A to 7E are drawings to explain mode transition examples according to the first exemplary embodiment.

[Page Processing in Registration Mode]

As shown in FIG. 6A, the page processing in the registration mode (the initial page (first page) of a document is a representative example), stores all figure data (path data) in the cache. At this time, the rendering section 362 registers path segment data as a current key in a work area of the RAM 312 (S410). If any of the figures is a trapezoid, the rendering section 362 executes trapezoid clipped processing (S414). The rendering section 362 registers figure data indicating patterns of the clipped trapezoids in the figure pattern registration section 365 in association with the path segment data, namely, "registers the figure data in the cache" (S417). The rendering section 362 also performs the figure drawing to generate bit map data using the figure data (S418). Such processing is repeated for all figures in the page p to be processed. In this process, the figure appearance state counting section 352 counts the number of registered paths (number of drawn figures n_p) (S419).

The cache effectiveness determination section 354 performs the threshold-value determination for the number of drawn figures n_p (S419). If "0≦the number of drawn figures n_p<N1," the cache function control section 356 maintains the "registration mode" in processing of a next page. If "N1≦n_p<N2," the cache function control section 356 sets the operation mode of the next and subsequent pages to the "ineffective mode." If "N2≦n_p," the cache function control section 356 sets the operation mode of the next page to the "determination mode" (S419).

[Page Processing in Determination Mode]

As shown in FIG. 6B, the page processing in the determination mode (a second page is a representative example) does not perform the cache registration, executes the figure drawing using the cache search, and determines the effective or ineffective mode for the next and subsequent pages during this process. If the operation mode cannot be determined, the determination mode is maintained.

At this time, the rendering section 362 registers path segment data as a current key in the work area (S420) and executes the cache search (S422). If a figure to be processed is not hit in the cache and if the figure to be processed is a trapezoid, the rendering section 362 executes the trapezoid clipped processing (S424). The rendering section 362 performs the figure drawing to generate bit map data using the figure data acquired in the trapezoid clipped processing (S428). If the figure to be processed is hit in the cache, the rendering section 362 obtains the corresponding figure data (figure pattern) from the cache (S426) and performs the figure drawing to generate bit map data using the figure data (S428). Such processing is repeated for all figures in the page p to be processed. In this process, the figure appearance state counting section 352 counts the number of registered paths (number of drawn figures n_p) (S421) and also counts the number of re-appearances h_p if the cash is hit (S425).

The cache effectiveness determination section 354 performs the threshold-value determination for the number of drawn figures n_p and the number of re-appearances h_p (S429). If "$0 \leq n\_p < N3$," the cache function control section 356 maintains the "determination mode" in processing of the next page. If "$N3 \leq n\_p$ and $h\_p < H$," the cache function control section 356 sets the operation mode of the next and subsequent pages to the "ineffective mode". If "$N3 \leq n\_p$ and $H \leq h\_p$," the cache function control section 356 sets the operation mode of the next and subsequent pages to the "effective mode (S429).

[Page Processing in Effective Mode (Determined)]

As shown in FIG. 6C, the page processing of third and subsequent pages in which the effective mode has been determined, does not perform the cache registration and executes the figure drawing using the cache search. If processing of a page being processed is completed and if a remaining page exists, similar processing is also executed for the next page in the "effective mode."

At this time, the rendering section 362 registers path segment data as a current key in the work area (S430) and executes the cache search (S432). If a figure to be processed is not hit the cache and if the figure to be processed is a trapezoid, the rendering section 362 executes trapezoid clipped processing (S434). The rendering section 362 performs the figure drawing to generate bit map data using the figure data acquired in the trapezoid clipped processing (S438). If the figure to be processed is hit in the cache, the rendering section 362 obtains the corresponding figure data (figure pattern) from the cache (S436) and performs the figure drawing to generate bit map data using the figure data (S438). Such processing is repeated for all figures in the page p to be processed.

[Page Processing in Ineffective Mode (Determined)]

Figure 6D:
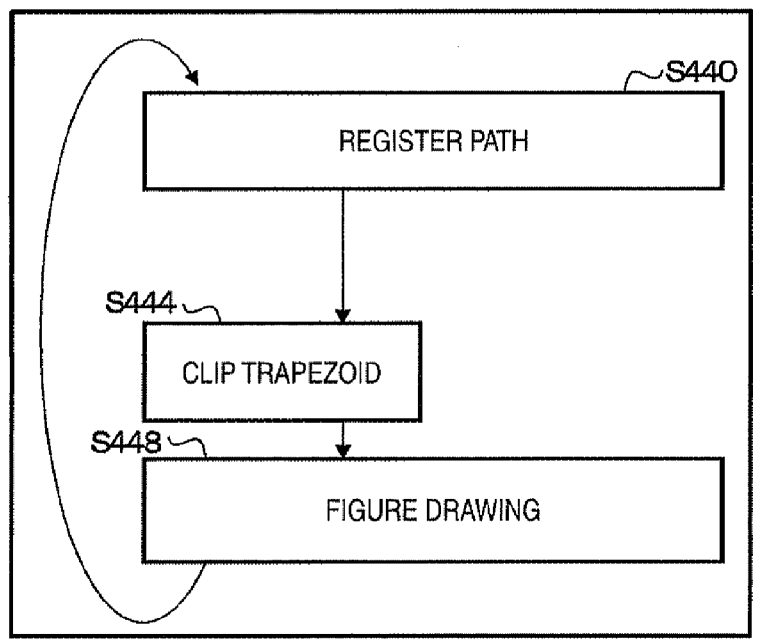
FIG. 6D is a drawing to explain processing in a page where an ineffective mode is determined.

As shown in FIG. 6D, the page processing in the ineffective mod does not perform the cache registration and does not execute the figure drawing using the cache search. If processing of a page being processed is completed and if a remaining page exists, similar processing is also executed for the next page in the "ineffective mode."

At this time, the rendering section 362 registers path segment data as a current key in the work area (S440). If a figure to be processed is a trapezoid, the rendering section 362 executes trapezoid clipped processing (S444). The rendering section 362 performs the figure drawing to generate bit map data using the figure data acquired in the trapezoid clipped processing (S448). Such processing is repeated for all figures in the page p to be processed.

Mode Transition Examples

In a first example of mode transition shown in FIG. 7A, since "$N2 \leq n\_1$" is satisfied in the "registration mode" of the first page, the second page is set to the "determination mode". Also, since "$N3 \leq n\_2$ and $H \leq h\_p$" is satisfied in the second page, the third and subsequent pages are set to the "effective mode." Cases where the first and second pages contain a large number of the same figures fall under this first example. For example, the case where the same graphic background, which is generated using a large number of figures ($N2, N3 \leq n\_p$) in combination (for example, background used in "JEITA IT-3011 test pattern"; the same applies to the description of other mode transition examples), exists in the first and second pages of a presentation document is a typical example. In this connection, the third and subsequent pages are all processed in the "effective mode" regardless of whether or not a similar graphic background to that of the first and second pages actually exists in the third and subsequent pages.

In a second example of the mode transition shown in FIG. 7B, since "$n\_1 < N1$" is satisfied in the "registration mode" of the first page, the "registration mode" is maintained in the second page. Since "$N2 \leq n\_2$" is satisfied in the "registration mode" of the second page, the third page is set to the "determination mode". Also, since "$N3 \leq n\_3$ and $H \leq h\_p$" is satisfied in the third page, the fourth and subsequent pages are set to the "effective mode." Cases where the number of figures in the first page is small and the second and third pages contain a large number of the same figures fall under this second example. For example, the case where the first page of a presentation document is a text and photo page and the same graphic background, which is generated using a large number of figures in combination, exists in the second and third pages is a typical example. In this connection, the third and subsequent pages are all processed in the "effective mode" regardless of whether or not a similar graphic background to that of the second and third pages actually exists in the fourth and subsequent pages.

In a third example of mode transition shown in FIG. 7C, since "$N2 \leq n\_1$" is satisfied in the "registration mode" of the first page, the second page is set to the "determination mode". Since "$n\_2 < N3$" is satisfied in the second page, the "determination mode" is maintained in the third page. Also, since "$N3 \leq n\_3$ and $H \leq h\_p$" is satisfied in the third page, the fourth and subsequent pages are set to the "effective mode." For example, cases where the second page of a presentation document is a text and photo page and the same graphic background, which is generated using a large number of figures in combination, exists in the first and third pages is a typical example. For example, pages like the first to sixth pages of "JEITA IT-3011 test pattern" fall under this example. In this connection, the fourth and subsequent pages are all processed in the "effective mode" regardless of whether or not a similar graphic background to that of the first and third pages actually exists in the fourth and subsequent pages.

In a fourth example of mode transition shown in FIG. 7D, since "$N2 \leq n\_1$" is satisfied in the "registration mode" of the first page, the second page is set to the "determination mode". Since "$N3 \leq n\_3$ and $h\_p < H$" is satisfied in the second page, the third and subsequent pages are set to the "ineffective mode." For example, cases where although the same graphic background, which is generated using a large number ("$N2 \leq n\_1$") of figures in combination exists in the first page of a presentation document, the number of drawn figures n_2 in the second page is less than N3 fall under this example. In this connection, the third and subsequent pages are all processed in the "ineffective mode" regardless of whether or not a similar graphic background to that of the first page actually exists in the third and subsequent pages.

In a fifth example of the mode transition shown in FIG. 7E, since "$N1 \leq n\_1 \leq N2$" is satisfied in the "registration mode" of the first page, the second and subsequent pages are set to the "ineffective mode." For example, cases where although figures exist in the first page of a presentation document, the number of drawn figures n_1 is less than N2 fall under this example. In this connection, the second and subsequent pages are all processed in the "ineffective mode" regardless of whether or not there is a page containing the same graphic background, which is generated using a large number ("N2≦n_1") of figures in combination, in the second and subsequent pages.

As described above, in the mechanism of the first exemplary embodiment, in the "registration mode" of the first page, the "preliminary determination processing" is executed to determine as to whether or not the "registration mode" is maintained and determining if the operation mode should be changed to the "ineffective mode" or the "determination mode." If it cannot be determined that the operation mode should be changed to the "ineffective mode" or the "determination mode," the "registration mode" is maintained. If information conducive to determination in the "determination mode" is sufficiently acquired, the operation mode is switched to the "determination mode." If it can be determined, only based on a page to be processed, that a document is one for which the figure drawing cache function is effective, the operation mode is switched to the "ineffective mode."

Accordingly, the figure appearance state in each page of a document is predicted, and the cache control processing is executed so that if it is known that cache is not effective, the cache function is turned off and that if it is known that cache is effective, the cache function is turned on. Thus, in figure drawing, cache processing is performed efficiently. Thereby, high-speed drawing processing is accomplished, and the effect of change in the figure appearance state on the output processing speed is lightened.

That is, at the time of the drawing processing of a document having a high figure re-appearance rate, the cache function is made effective for speeding up the print function. On the other hand, at the time of the drawing processing of a document having a low figure re-appearance rate, the cache function is made ineffective for suppressing occurrence of a fruitless search time. Accordingly, a phenomenon in which the print speed is decreased because of change in the figure re-appearance rate is avoided, and an efficient cache function can be provided. A decrease in the fruitless search time and efficient use of memory at the executing time are accomplished. Further, the cache effectiveness is dynamically determined, so that the cache function operates efficiently.

Rendering Processing

Second Exemplary Embodiment

Rendering processing according to a second exemplary embodiment will be described below: The rendering processing according to the second exemplary embodiment basically adopts a similar processing technique to that of the first exemplary embodiment. However, the second exemplary embodiment attempts to deal with a situation in which the "determination mode" is repeated endlessly. The rendering processing according to the second exemplary embodiment will be described with focusing attention on this difference.

[Overall Operation]

FIGS. 8A and 8B are drawings to explain overall processing of the rendering processing according to the second exemplary embodiment. FIG. 8A is a flowchart to explain a overall processing procedure of the rendering processing according to the second exemplary embodiment. FIG. 8B is a transition diagram of the operation mode in the rendering processing according to the second exemplary embodiment. The processing step numbers are indicated by six hundreds and processing steps identical with or similar to those of the first exemplary embodiment are given numbers of tens or ones similar to those of the first exemplary embodiment (hundreds).

The rendering processing according to the second exemplary embodiment is similar to that of the first exemplary embodiment except processing in the "determination mode." In initialization, an operator r1 for monitoring the number of repetitions of the "determination mode" is set to 1 (S610). If the page processing is completed in the "determination mode" (determination at S622), the cache function control section 356 determines an operation mode of a next page based on the processing results of the figure appearance state counting section 352 and the cache effectiveness determination section 354.

If the page processing is entered in the "determination mode," the rendering processing section 350 executes the figure drawing processing by having the figure drawing section 368 to search the cache of the figure pattern registration section 365. In this process, the figure appearance state counting section 352 counts the number of re-appearances h_p and the number of drawn figures, and sends the results to the cache effectiveness determination section 354 (S650).

The cache effectiveness determination section 354 performs the threshold-value determination for the number of drawn figures n_p in a page p to be processed and also performs the threshold-value determination for the number of re-appearances h_p, and sends the results to the cache function control section 356 (S652).

The cache function control section 356 determines, based on the comparison result, as to whether or not a document is one for which the figure drawing cache function is effective, and sets an operation mode of a next page. In the second exemplary embodiment, if the number of drawn figures n_p falls below the determination threshold value N3 (n_p<N3 at S652) or if the number of re-appearances h_p falls below the determination threshold value H even though the number of drawn figures n_p is equal to or larger than the determination threshold value N3 (N3≦n_p and h_p<H at S652), the cache function control section 356 maintains the "determination mode" in processing of the next page, and increments the operator r1 for monitoring the number of repetitions of the "determination mode" by one (S654).

The cache function control section 356 makes a comparison between the post-incremented operation r1 and a determination threshold value R1 (S655). If the operator r1 reaches the determination threshold value R1 (r1=R1), the cache function control section 356 sets the operation mode of the next and subsequent pages to the "ineffective mode" (S656). At this time, the cache function control section 356 deletes the cache data, which have already been registered in the figure pattern registration section 365 (S657).

When it is to be determined as to whether or not "a document is one for which the figure drawing cache function is effective", if a page in which the number of drawn figures n_p is small or a page in which the figure drawing cache function is not effective because the hit rate is low although the number of figures in the page p to be processed is sufficiently large is continued, the second exemplary embodiment attempts to avoid that the "determination mode" is repeated.

In this connection, in this example, when the number of re-appearances h_p falls below the determination threshold value H although the number of drawn figures n_p is equal to or larger than the determination threshold value N3 (N3≦n_p and h_p<H at S652), the "determination mode" is also maintained. However, this is not essential. The operation mode may be set to the "ineffective mode" as in the first exemplary embodiment. In this example, however, it becomes possible to handle in the "effective mod" in the case where a page containing the same graphic background as a page already registered in the cache re-appears in the third page or a later page.

If the number of drawn figures n_p is equal to or larger than the determination threshold value N3 and the number of re-appearances h_p is equal to or larger than the determination threshold value H (N3≦n_p and H≦h_p at S652), the cache function control section 356 sets the operation mode of the next page to the "effective mode" (S658).

Specific Example of Second Exemplary Embodiment

Mode Transition Examples

Figure 9A:
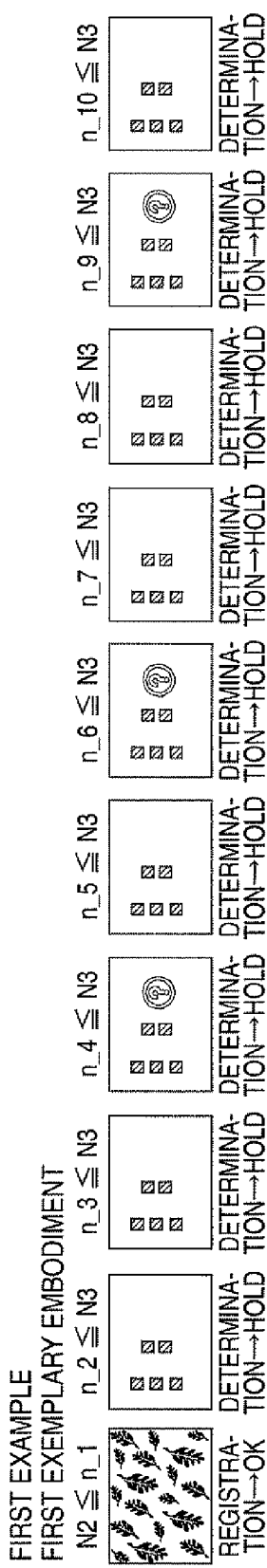
Figure 9B:
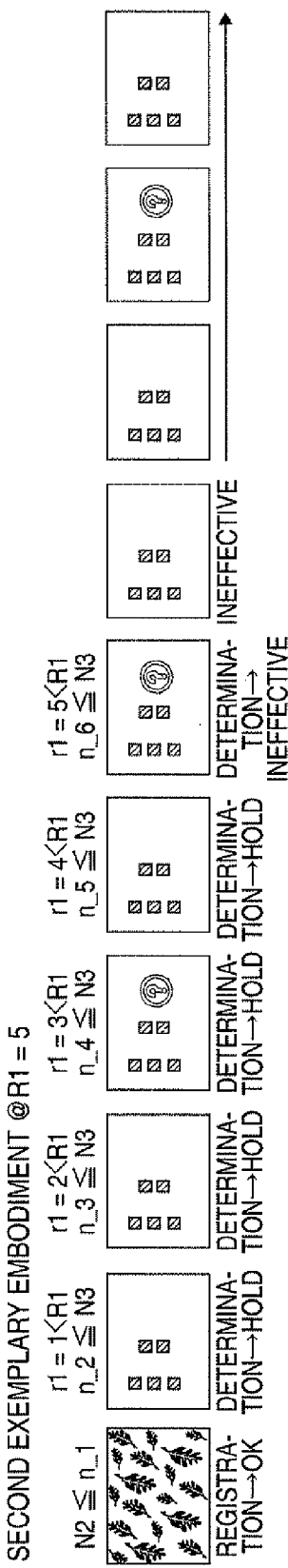

FIGS. 9A to 9F are drawings to explain specific examples of the graphic drawing processing according to the second exemplary embodiment with reference to mode transition examples. FIGS. 9A and 9B are drawings to explain a difference between the first and second exemplary embodiments with reference to mode transition examples.

A first example shown in FIGS. 9A and 9B is a typical example in which a graphic background, which is generated using a large number of figures in combination, exists in the first page of a presentation document, a page where a graphic background, which is generated using a small number of figures in combination, exists continues from the second page to the last page and a page where a graphic background, which is generated using a large number of figures in combination (which may be the same as or may differ from that of the first page), does not exist from the second page to the last page.

In such a case, in the first exemplary embodiment, as shown in FIG. 9A, since "N2≦n_1" is satisfied in the "registration mode" of the first page, the second page is set to the "determination mode". Since "n_p<N3" is continuously satisfied in the second and subsequent pages, the "determination mode" is continuously maintained in the third to subsequent pages. It might be said that although the figure drawing cache function is not effective, the figure drawing using the cache search is performed.

In contrast, in the second exemplary embodiment, as shown in FIG. 9B, after the operator r1 for monitoring the number of continuations of the "determination mode" in the second and subsequent pages reaches the determination threshold value R1 (r1=R1), the operation mode is set to the "ineffective mode." Therefore, the number of pages where the figure drawing using the cache search is executed although the figure drawing cache function is not effective is limited.

Figures 9C, 9D:

A second example shown in FIGS. 9C and 9D, for example, is a typical example where a graphic background (pattern A), which is generated using a large number of figures in combination, exists in the first page of a presentation document, a page where another graphic background (pattern B), which is generated using a large number of figures in combination, exists in the second and subsequent pages and the graphic background in the second and subsequent pages differs from that of the first page.

In such a case, in the first exemplary embodiment, as shown in FIG. 9C, since "N2≦n_1" is satisfied in the "registration mode" of the first page, the second page is set to the "determination mode". Also, since "N3≦n_p and h_2<H" is satisfied in the second page, the third and subsequent pages are set to the "ineffective mode."

In contrast, in the second exemplary embodiment, as shown in FIG. 9D, "N3≦n_p and h_p<H" continues in the second and subsequent pages and thus, the "determination mode" is maintained. However, after the operator r1 for monitoring the number of continuations of the "determination mode" reaches the determination threshold value R1 (r1=R1), the operation mode is set to the "ineffective mode." The number of pages where the figure drawing using the cache search is executed although the figure drawing cache function is not effective is limited.

A third example shown in FIGS. 9E and 9F, for example is a typical example in which a graphic background (pattern A), which is generated using a large number of figures in combination, exists in the first page of a presentation document and a page where another graphic background (pattern B), which is generated using a large number of figures in combination, exists in the second and subsequent pages in a range where "r1<R1" is satisfied, the graphic background (pattern B) is different from that (pattern A) in the first page, and a page having the same graphic background as that of the first page appears again before "r1=R1" is satisfied.

In such a case, in the first exemplary embodiment, as shown in FIG. 9E, since "N2≦n_1" is satisfied in the "registration mode" of the first page, the second page is set to the "determination mode". Also, since "N3≦n_p and h_2<H" is satisfied in the second page, the third and subsequent pages are set to the "ineffective mode."

In contrast, in the second exemplary embodiment, as shown in FIG. 9F, since "N3≦n_p and h_p<H" continues in the second and subsequent pages, the "determination mode" is maintained. However, the operation mode is set to the "effective mode" by detecting that "N3≦n_p and H≦h_P" is satisfied before the operator r1 for monitoring the number of continuations of the "determination mode" reaches the determination threshold value R1. While the number of pages where the figure drawing using the cache search is executed although the figure drawing cache function is not effective is limited, when a page where the figure drawing cache function is effective re-appears, the cache function is turned on. Thereby, print processing is speeded up. For example, there is a case where the second exemplary embodiment can effectively function if a document is created using different types of graphic backgrounds.

Rendering Processing

Third Exemplary Embodiment

Rendering processing according to a third exemplary embodiment will be described below: The rendering processing according to the third exemplary embodiment attempts to change the operation mode to any other mode by executing an interrupt check at an appropriate page cycle after the "effective mode" or the "ineffective mode" is set. As an example, it is considered that when the "ineffective mode" is being continued, the operation mode is changed to the "registration mode" and that when the "effective mode" is being continued, the operation mode is changed to the "determination mode" or the "ineffective mode."

[Overall Operation]

Figure 10A:
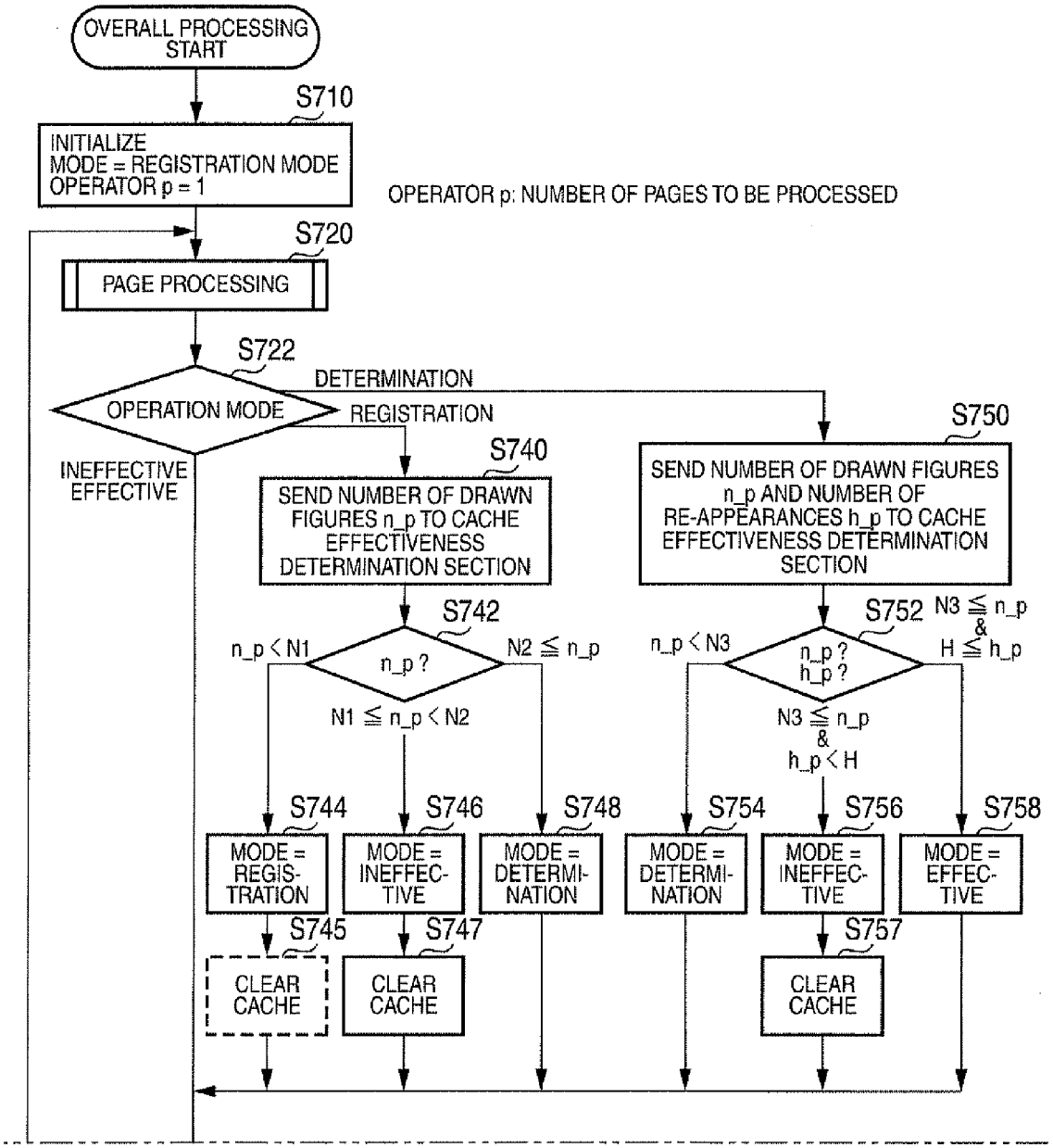
FIG. 10A is a flowchart to explain a general processing procedure of rendering processing according to a third exemplary embodiment of the invention (first example)
Figure 10B:
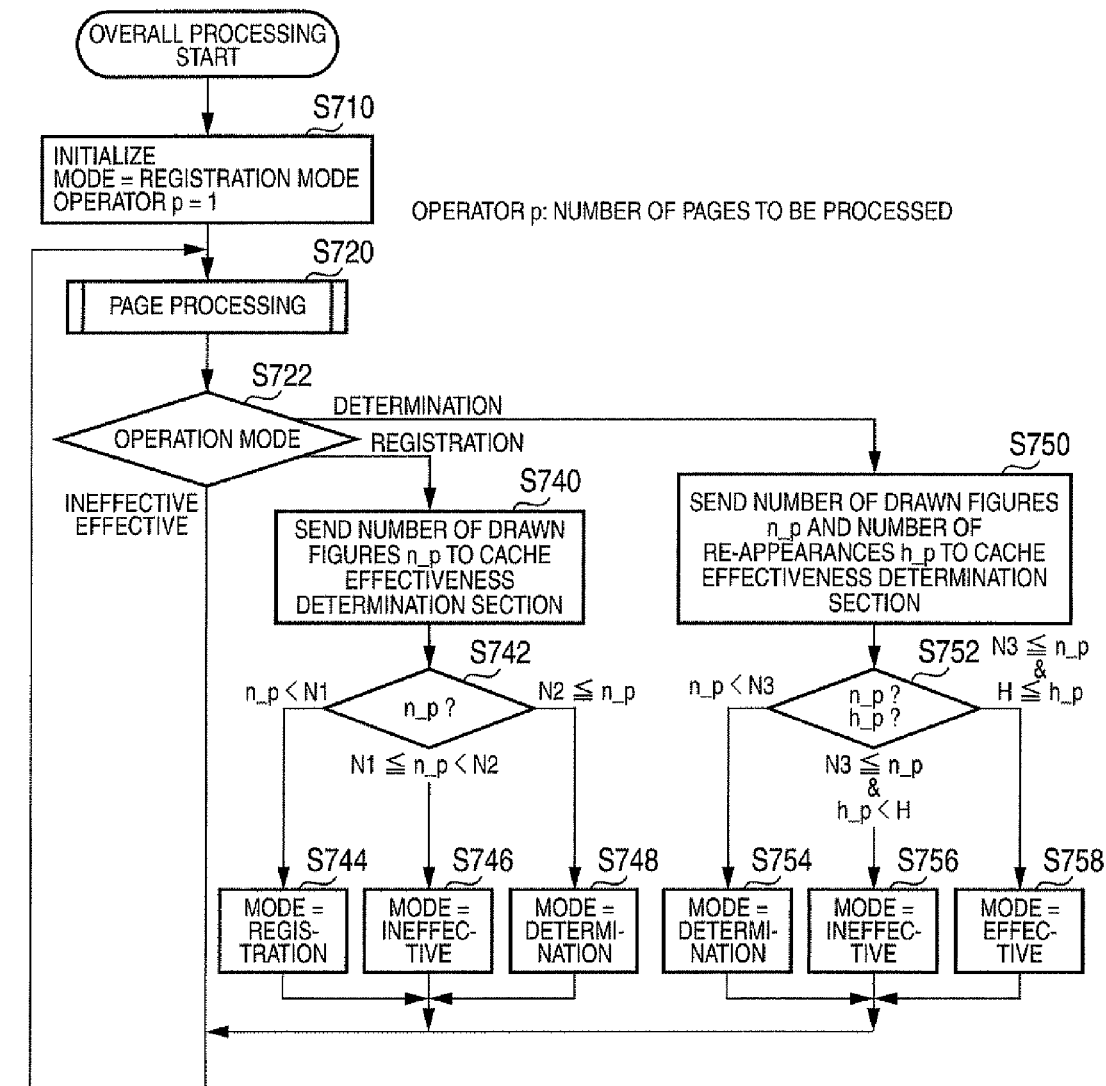
FIG. 10B is a flowchart to explain a general processing procedure of rendering processing according to the third exemplary embodiment of the invention (second example)

FIGS. 10A and 10B are flowcharts to explain the overall processing procedure of the rendering processing according to the third exemplary embodiment. The processing step numbers are indicated by seven hundreds, and processing steps identical with or similar to those of the first exemplary embodiment are given numbers of tens and ones similar to those of the first exemplary embodiment (hundreds). Here, an example wherein a mechanism of the third exemplary embodiment is applied to the first exemplary embodiment is shown, but it can also be applied to the second exemplary embodiment in a similar manner.

The third exemplary embodiment is similar to the first exemplary embodiment except for the case where the "ineffective mode" or the "effective mode" continues. If a process of checking presence/absence of a remaining page (S780, S782) finds a remaining page and the operation mode is the "ineffective mode" or the "effective mode" (YES at S784), the cache function control section 356 determines as to whether or not the immediately preceding page processing is processing of a page immediately after mode transition (S790). If the page processing is processing of a page immediately after mode transition (YES at S790), the cache function control section 356 sets an operator r2 for monitoring the number of repetitions of the "ineffective mode" or the "effective mode" to 1 and proceeds to processing of a next page (S791).

If the page processing is not processing of a page immediately after mode transition (NO at S790), the cache function control section 356 increments the operator r2 by one (S792). Then, the cache function control section 356 makes a comparison between the post-incremented operation r2 and a determination threshold value R2 (S794).

If the operator r2 reaches the determination threshold value R2 (r2=R2), the cache function control section 356 releases (cancels) the "ineffective mode" or the "effective mode" and proceeds to processing of a next page. For example, in a first technique shown in FIG. 10A, if the "ineffective mode" is continued, the operation mode is changed to the "registration mode" (ineffective at S796, S797). If the "effective mode" is continued, the operation mode is changed to the "determination mode" (effective at S796, S798).

As in a second technique shown in FIG. 10B, the operation mode may be changed to the "registration mode" regardless of whether the "ineffective mode" is continued or the "effective mode" is continued (YES at S794, S799).

Specific Examples of Third Exemplary Embodiment

Mode Transition Examples

FIGS. 11A to 11K are drawings to explain specific examples of the graphic drawing processing according to the third exemplary embodiment with reference to mode transition examples. FIGS. 11A to 11K show differences between the first and third exemplary embodiments with reference to the mode transition examples.

A first example shown in FIGS. 11A and 11B, for example, is a typical example where the same graphic background exists in the first and second pages of a presentation document, and a text or photo page or a page where the number of figures is small continues from the third page to the last page.

In such a case, in the first exemplary embodiment, as shown in FIG. 11A, since the third and subsequent pages are set to the "effective mode", processing is performed for all the third and subsequent pages in the "effective mode" even though a graphic background similar to that of the first and second pages does not actually exist in the third and subsequent pages.

In contrast, in the third exemplary embodiment, as shown in FIG. 11B, when the operator r2 for monitoring the number of continuations of the "effective mode" reaches the determination threshold value R2 in the third and subsequent pages, a next page is set to the "determination mode." Thus, the number of pages where the figure drawing using the cache search is executed although the figure drawing cache function is not effective is limited.

Figure 11C:
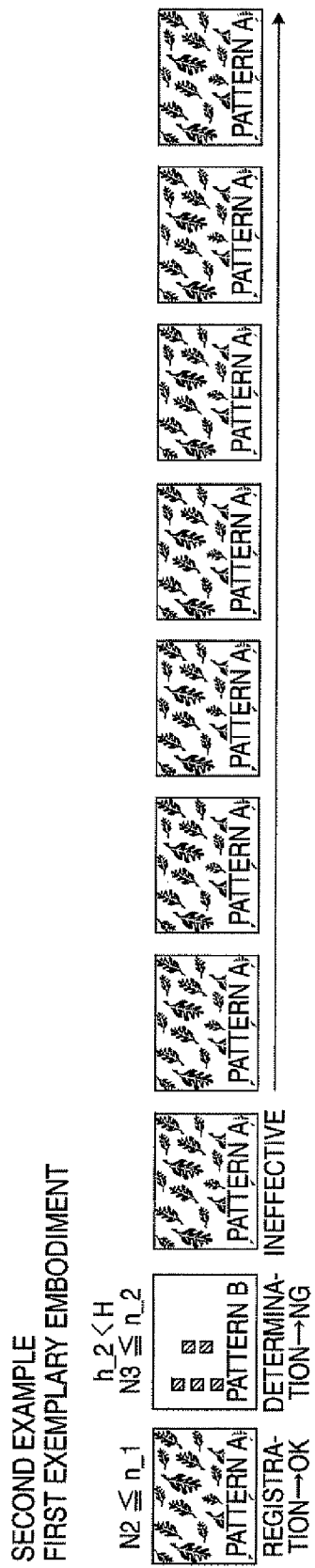
Figure 11D:
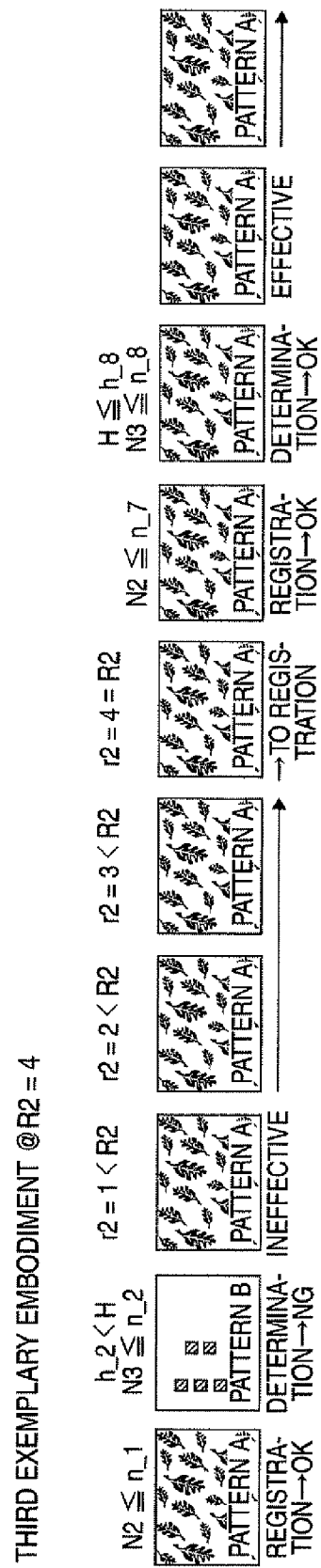

A second example shown in FIGS. 11C and 11D is a typical example in which although, in the "determination mode," next and subsequent pages are set to the "ineffective mode," actually pages where a similar graphic background to that of the cache registered page exists continue.

In such a case, in the first exemplary embodiment, as shown in FIG. 11C, for example, since the third and subsequent pages are set to the "ineffective mode", processing is performed for all the third and subsequent pages in the "ineffective mode" even though a graphic background similar to that of the first page actually exists in the third and subsequent pages. In other words, even though the figure drawing cache function is actually effective, the figure drawing using the cache search is not executed.

In contrast, in the third exemplary embodiment, as shown in FIG. 11D, when the operator r2 for monitoring the number of continuations of the "ineffective mode" reaches the determination threshold value R2 in the third and subsequent pages, an operation mode of a next page is changed to the "registration mode", and further in the "determination mode" of the next page, the next and subsequent pages are set to the "effective mode." Thus, the third exemplary embodiment can avoid the situation in which figure drawing using the cache search is not executed even though the figure drawing cache function is actually effective.

Figure 11E:
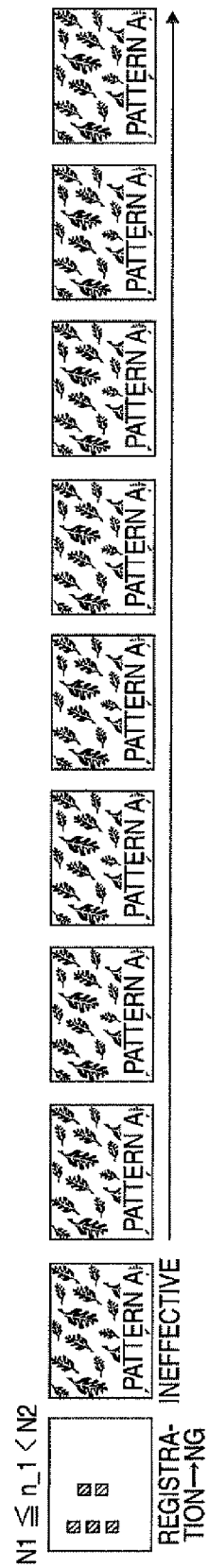
Figure 11F:

A third example shown in FIGS. 11E and 11F is a typical example where, in the "registration mode," the next subsequent pages are set to the "ineffective mode," pages where a similar graphic background exists actually continue.

In such a case, in the first exemplary embodiment, as shown in FIG. 11E, for example, since the second and subsequent pages are set to the "ineffective mode", processing is performed for all the second and subsequent pages in the "ineffective mode" although a page of a similar graphic background actually continues in the second and subsequent pages. In other words, the figure drawing using the cache search is not executed even though the figure drawing cache function is actually effective.

In contrast, in the third exemplary embodiment, as shown in FIG. 11F, when the operator r2 for monitoring the number of continuations of the "ineffective mode" reaches the determination threshold value R2 in the second page or the later page, a next page is changed to the "registration mode", and further in the "determination mode" of the next page, the next and subsequent pages are set to the "effective mode." Thus, the third exemplary embodiment can avoid the situation in which the figure drawing using the cache search is not executed even though the figure drawing cache function is actually effective.

Figure 11G:
Figure 11H:
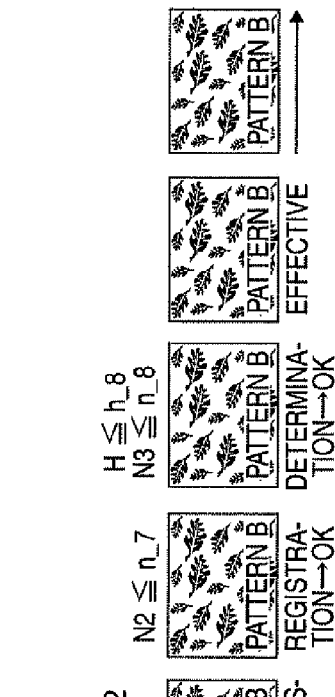

A fourth example shown in FIGS. 11G and 11H is a typical example where, in the "determination mode," next and subsequent pages are set to the "ineffective mode," pages where a graphic background different from the cache registered page exists actually continue.

In such a case, in the first exemplary embodiment, as shown in FIG. 11G, for example, since "$N3 \leqq n\_p$ and $h\_2<H$" is satisfied in the "determination mode" of the second page, the third and subsequent pages are set to the "ineffective mode". Processing is performed for all the third and subsequent pages in the "ineffective mode" although a graphic background (pattern B) different from that (pattern A) of the first page actually continues in the second and subsequent pages. In other words, the figure drawing using the cache search is not executed even though the figure drawing cache function is actually effective if the cache registration is executed in the second and subsequent pages.

In contrast, in the third exemplary embodiment, as shown in FIG. 11H, when the operator r2 for monitoring the number of continuations of the "ineffective mode" reaches the determination threshold value R2 in the third page or the later page, a next page is changed to the "registration mode". Thus, the cache registration is executed in the second and subsequent pages, and further in the "determination mode" of the next page, the next and subsequent pages are set to the "effective mode." Thus, the third exemplary embodiment can avoid the situation in which the figure drawing using the cache search is not executed even though the figure drawing cache function is actually effective.

A fifth example shown in FIGS. 11I to 11K is a typical example in which a document where different types of graphic backgrounds are switched at a midpoint. In such a case, in the first exemplary embodiment, as shown in FIG. 11I, for example, the third and subsequent pages are set to the "effective mode." The figure drawing cache function is effective for a page containing the same graphic background as the first page (pattern A) where the cache registration is executed. However, the figure drawing using the cache search is executed even though the figure drawing cache function is not effective after a page containing another graphic background (pattern B) is switched to.

In contrast, in the third exemplary embodiment, as in a first technique shown in FIG. 11J, when the operator r2 for monitoring the number of continuations of the "effective mode" reaches the determination threshold value R2 after a page containing another graphic background (pattern B) is switched to, a next page is changed to the "determination mode." In this case, since "N3≦n_p and h_p<H" is satisfied in the "determination mode" of the next page, the next and subsequent pages are set to the "ineffective mode." When the operator r2 for monitoring the number of continuations of the "ineffective mode" reaches the determination threshold value R2, a next page is changed to the "registration mode". Thus, the cache registration is executed with the current page pattern (pattern B), and further in the "determination mode" of the next page, the next and subsequent pages are set to the "effective mode." Thus, the third exemplary embodiment can avoid the situation in which figure drawing using a cache search is not executed even though the figure drawing cache function is actually effective.

As in the second technique shown in FIG. 11L, when the operator r2 for monitoring the number of continuations of the "effective mode" reaches the determination threshold value R2 after a page containing another graphic background is switched to, a next page is changed to the "registration mode." In this case, the cache registration is executed with the current page pattern (pattern B), and further in the "determination mode" of the next page, the next and subsequent pages are set to the "effective mode." Thus, the third exemplary embodiment can avoid the situation in which the figure drawing using the cache search is not executed even though the figure drawing cache function is actually effective.

The first and second techniques are the same in that the situation in which figure drawing using a cache search is not executed although the figure drawing cache function is effective is eliminated; however, in the second technique, the figure drawing using a cache search effectively functions more speedily than that in the first technique.

Thus, in the third exemplary embodiment, when the number of continuations of the "effective mode" or the "ineffective mode" reaches a given value, the current mode is canceled and allowed to be changed to another mode. Thus, for example, even if a page containing a graphic background and a page containing no graphic background are mixed or even if pages containing different graphic backgrounds are mixed, on/off control of the figure drawing using a cache search effectively functions. While the number of pages where figure drawing using a cache search is executed although the figure drawing cache function is not effective is limited, when a page where the figure drawing cache function is effective exists (preferably continues), the cache function is turned on, whereby print processing is speeded up.

<Configuration Using an Electronic Computer>

Figure 13:
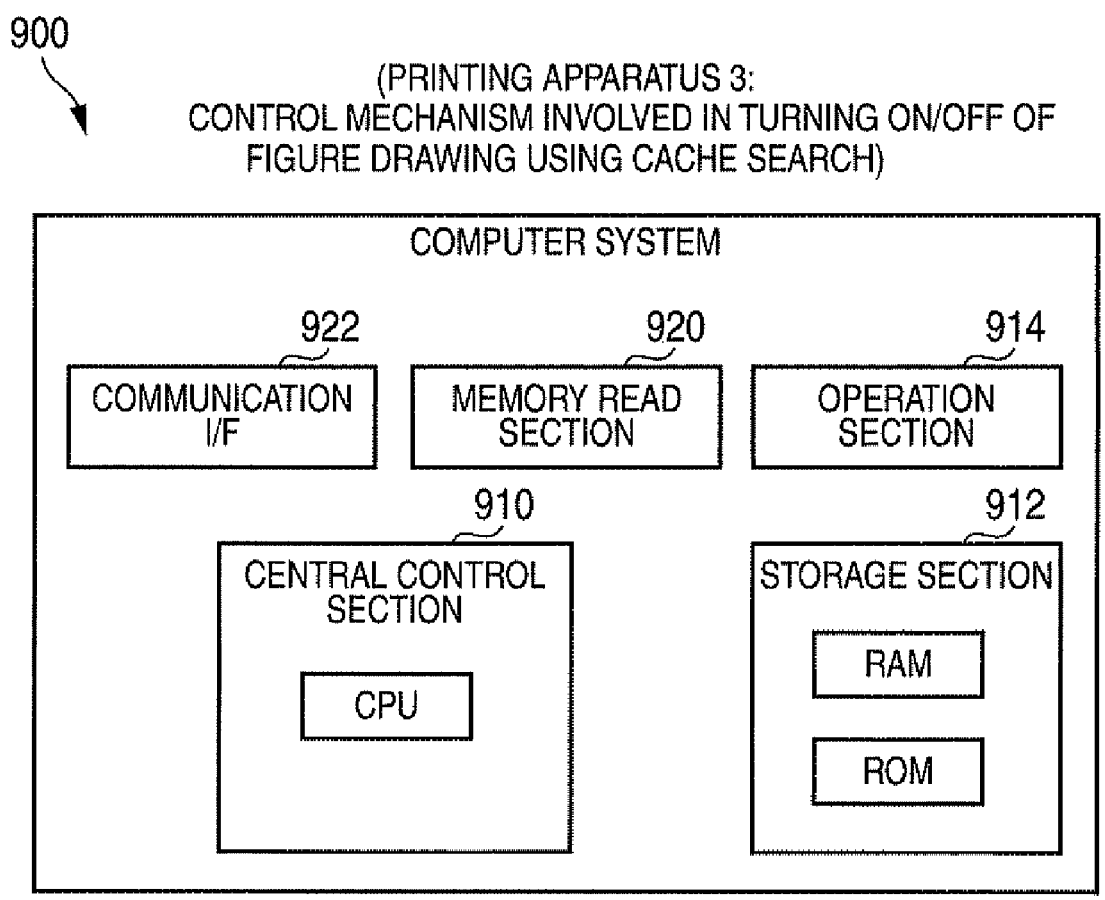
FIG. 13 is a block diagram to show a configuration example in which a control mechanism for turning on/off of figure drawing using a cache search is implemented by an electronic computer.

FIG. 13 is a block diagram to show another configuration example in which a control mechanism for turning on/off of figure drawing by performing a cache search in the printing apparatus 3. It shows a more real hardware configuration of the on/off control mechanism of figure drawing using a cache search of the printing apparatus 3 made up of components such as a microcomputer for executing software.

That is, in this exemplary embodiment, the control mechanism of the printing apparatus 3 for performing control processing involved in on/off switching of figure drawing using a cache search is implemented not only as a hardware processing circuit, but also as software using an electronic computer based on program code for providing the function. Therefore, a preferred program for implementing the mechanism according to the embodiment as software using an electronic computer or a computer-readable storage medium storing the program is extracted as the invention. The mechanism for executing the function by software is adopted, whereby the processing procedure, etc., is easily changed without changing the hardware.

The on/off switching sequence of figure drawing using a cache search described above can be realized not only by hardware or software solely, but also by a composite configuration of hardware and software. To execute software processing, a program indicating the processing procedure is built (installed) in a storage medium in a computer and is executed or a program is built in a general-purpose computer that can execute various types of processing and is executed.

A program for causing a computer to execute the on/off switching function of figure drawing using a cache search is distributed through a record medium such as a CD-ROM. The program may be stored not only a CD-ROM, but also on an FD. An MO drive may be provided for storing the program on MO or the program may be stored in any other record medium such as a nonvolatile semiconductor memory card of flash memory, etc. Further, the software program may be provided not only through a record medium, but also through a wired or wireless communication network, etc. For example, the program may be downloaded for acquisition or update through a network such as the Internet from a different server, etc. Further, the program is provided as a file describing the program code for providing the on/off switching function of figure drawing using a cache search, in which case the program may be provided not only as a collective program file, but also as individual program modules in response to the hardware configuration of a computer system.

For example, a computer system 900 has a central control section 910, a storage section 912, an operation section 914, and other peripheral members not shown in the figure.

The central control section 910 is implemented as a CPU (Central Processing Unit) or a microprocessor. The central control section 910 is similar to a nucleus unit of an electronic computer, for example, a CPU of a microminiature integrated circuit into which computation and control functions of the computer are collected as a typical example.

The storage section 912 includes ROM (Read-Only Memory) of a read-only storage section, RAM (Random Access Memory) of readable and writable memory, etc. The ROM stores a control program for the on/off switching function of figure drawing using a cache search and the like. The operation section 914 is a user interface for accepting operation of the user.

The control system of the computer system 900 may have a configuration wherein an external record medium (not shown) such as a memory card is made detachable and connection to a communication network of the Internet, etc., can be made. To do this, the control system may include a memory read section 920 for reading information on a portable record medium and a communication I/F 922 as an external communication interface device in addition to the central control section 910 and the storage section 912. The memory read section 920 makes it possible to install and update a program from an external record medium. The communication I/F 922 makes it possible to install and update a program through a communication network. The basic on/off switching mechanism of figure drawing using a cache search is similar to that of the embodiment described above.

Although the configuration example of implementing the control mechanism of the printing apparatus 3 as software in the computer is described, it is self-evident for those skilled in the art that hardware, software, a communication device, a combination thereof, or any other device can be used as specific device of the sections (containing function blocks) of the control mechanism of the printing apparatus 3 for providing the on/off switching function of figure drawing using a cache search of the embodiment. The function blocks may be collected into one function block. Software for causing a computer to execute program processing is installed in a distributed manner in response to the combination mode.

While the invention has been described using the exemplary embodiments, it is to be understood that the technical scope of the invention is not limited to the descriptions of the exemplary embodiments. Various changes or improvements can be added to the exemplary embodiments without departing from the spirit and the scope of the invention and embodiments to which changes or improvements are added are also contained in the technical scope of the invention.

The exemplary embodiments do not limit the invention, and feature combinations described in this exemplary embodiments are not necessarily indispensable for solution means of the invention. The exemplary embodiments contain various stages of the invention and various aspects of the invention can be extracted according to an appropriate combination in the disclosed configuration requirements. If some are deleted from all configuration requirements shown in the invention, a configuration wherein some configuration requirements are deleted can be extracted as the invention so long as an advantage can be provided.

Figure 12A:
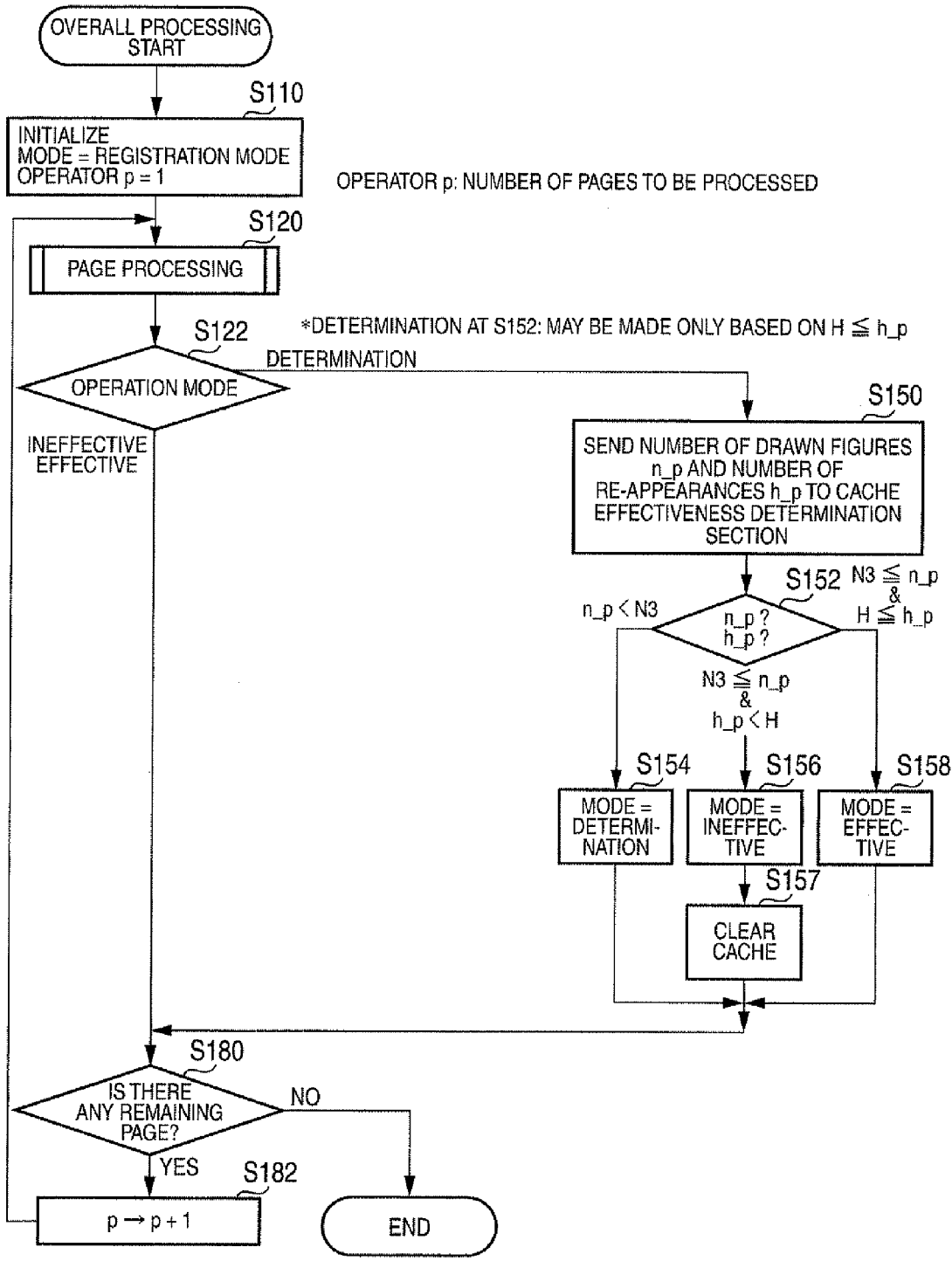
FIG. 12A is a first modified example.

For example, in this exemplary embodiments described above, the preliminary determination processing is executed in the registration mode, but execution of the preliminary determination processing is not indispensable as in a first modified example shown in FIG. 12A. In this case, however, the determination mode is entered in a state in which a sufficient number of pieces of cache data are not registered and thus it is considered that a more proper determination can be made in this exemplary embodiments described above.

Figure 12B:
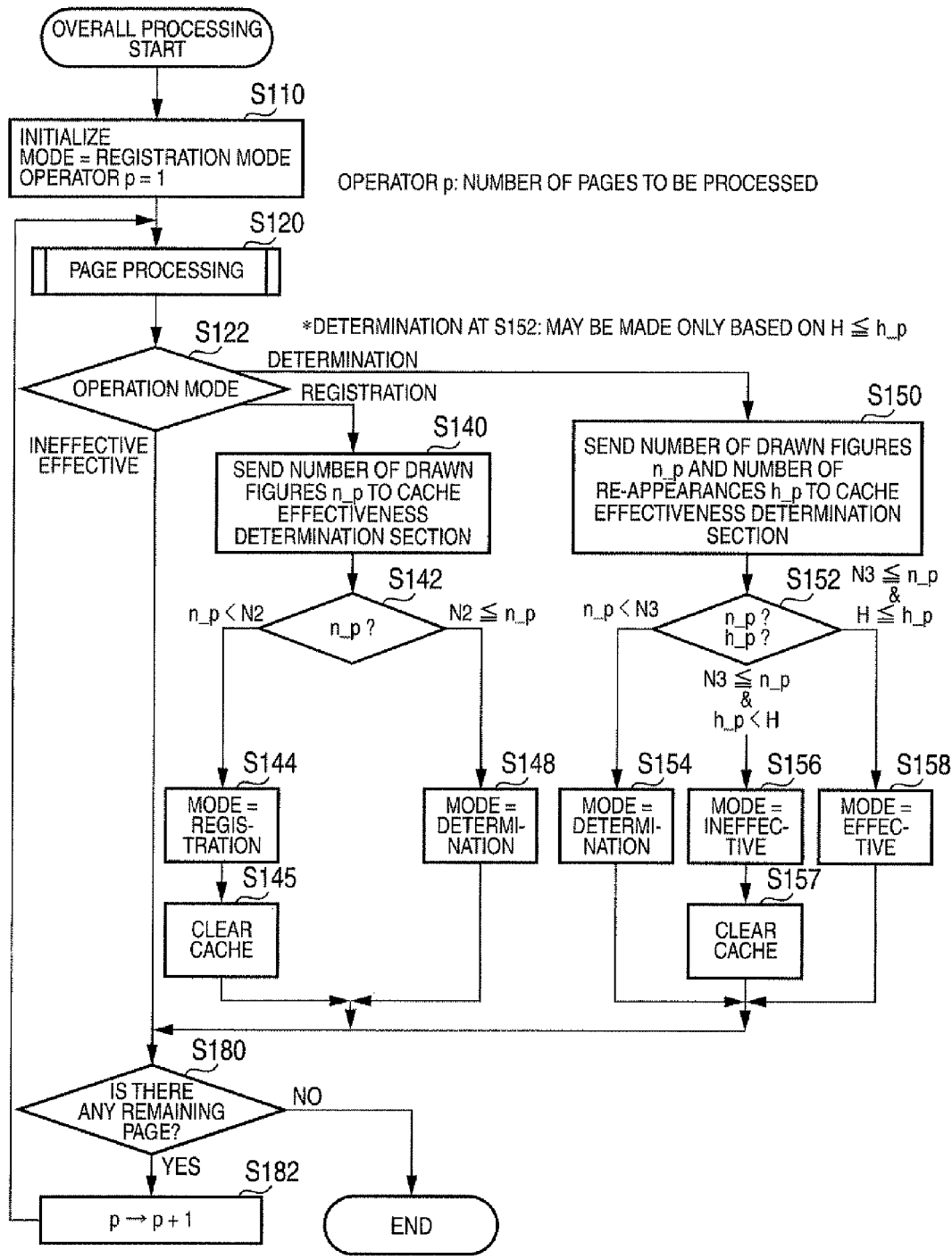
FIG. 12B is a second modified example.

To clear cache data in the registration mode when the registration mode is continued, cache registration is executed for each page. Thus, as in a second modified example shown in FIG. 12B, processing is performed with N1=N2, and processing of setting the operation mode to the ineffective mode when $N1 \leq n\_p < N2$ may be skipped. The fact that cache registration of a sufficient number of figures in the page being processed has been executed means that, for example, the possibility that a graphic background may exist is high, and it is conducive to determination processing in the next page.

Figure 12C:
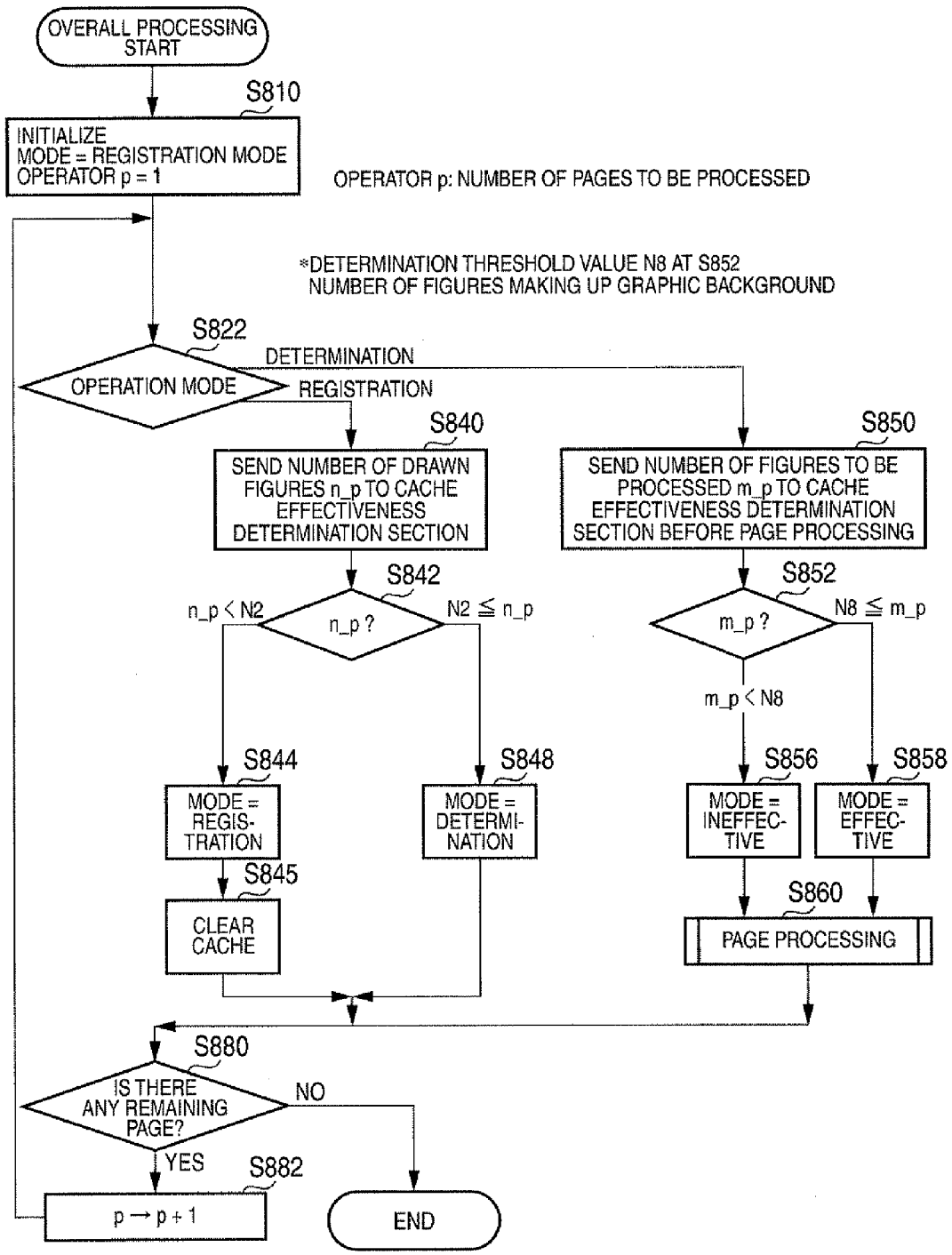
FIG. 12C is a third modified example.

As in a third modified example shown in FIG. 12C, after cache registration is completed, the determination mode may be entered before the page processing (S860) and the number of figures to be processed m_p in the page may be first determined (S850) and whether or not to cause figure drawing using a cache search to function may be controlled based on the threshold-value determination processing result with a determination threshold value N8 a little smaller than the number of figure patterns registered in the figure pattern registration section 365 (S852). The determination threshold value N8 means the number of figures making up a graphic background. To set this value to the value a little smaller than the number of figure patterns registered in the figure pattern registration section 365" has a meaning of considering cache registration of graphics other than the graphic background.

In this case, when the number of figures to be processed m_p is less than the determination threshold value N8 a little smaller than the number of figure patterns registered in the figure pattern registration section 365, it is determined that there is a page containing no graphic background, the mode is set to the ineffective mode, the figure drawing using a cache search is turned off, and figure drawing is performed by the first drawing section 366 only (S856). To turn off the figure drawing using a cache search, the cache data already registered is not discarded. Conversely, when the number of figures to be processed m_p exceeds the determination threshold value N8, it is determined that there is a page containing the same graphic background, the mode is set to the effective mode, and the figure drawing using a cache search is turned on (S858).

In the cache effective page, the cache function is turned on, whereby speeding up of print processing is ensured; in the cache ineffective page, the cache function is turned off, whereby decreasing of the print speed is prevented. In a page where the number of figures is small, fruitless cache search is not executed. Further, in this case, re-registration of once registered cache data in an adequate cycle may be adopted. In so doing, the case where the graphic background is switched to another graphic background from a midpoint can also be handled.

Figure 12D:
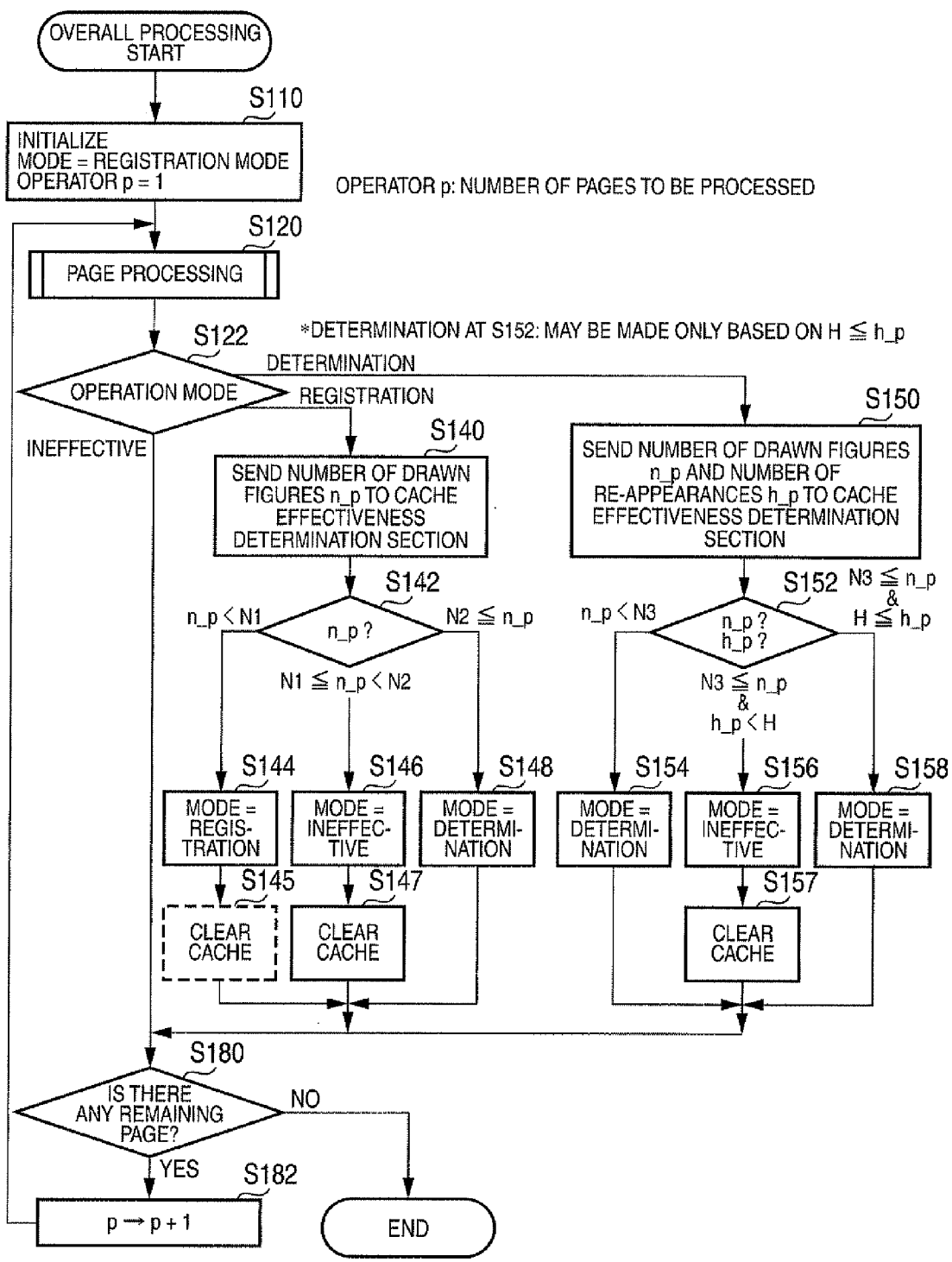
FIG. 12D is a fourth modified example.

In the first and second exemplary embodiments, when "$N3 \leq n\_p$ and $H \leq h\_P$" is satisfied, the mode is always set to the effective mode on and after the next page; however, it is not indispensable. As in a fourth modified example shown in FIG. 12D, the mode may be set to the determination mode so that figure drawing using a cache search may be executed in the determination mode. In this case, although threshold-value determination processing becomes an overhead, the effective mode is not continued and is switched to the ineffective mode in the case where the cache search function does not effectively work at a midpoint. For a cache effective document, the cache function is turned on, whereby speeding up of print processing is ensured; after a cache ineffective page is found, the cache function is turned off, whereby decreasing of the print speed is prevented.

In this exemplary embodiments described above, the application example to the printing apparatus has been described as an example of an image output apparatus, but the invention is not limited to figure drawing processing in the printing apparatus; for example, the invention may be applied to a display output unit using a CRT, a liquid crystal display, etc., as display means.

What is claimed is:

1. A drawing processing device comprising:
   a rendering section that performs rendering and generates a figure pattern based on a drawing command;
   a first figure drawing section configured to draw a figure based on a figure pattern obtained from the rendering section;
   a figure pattern registration section, wherein when the rendering section performs the rendering and generates a figure pattern, the figure pattern registration section registers the figure pattern;
   a second figure drawing section configured such that, if a drawing command is received and if a figure pattern corresponding to the received drawing command is registered in the figure pattern registration section, the second figure drawing section selects the corresponding registered figure pattern and draws a figure instead of the first figure drawing section drawing the figure; and
   a function control section, wherein based on an appearance state of figures in a page to be processed, the function control section controls whether or not figure drawing performed by the second figure drawing section is caused to function in the page to be processed.

2. The drawing processing device according to claim 1, further comprising:
   a threshold-value determination section that performs a threshold-value determination for at least one of the number of figure patterns registered in the figure pattern registration section, the number of figures in the page to be processed, and a frequency at which the second figure drawing section performs the figure drawing, wherein
   the function control section performs the control based on the determination result of the threshold-value determination section.

3. The drawing processing device according to claim 2, wherein when the frequency at which the second figure drawing section performs the figure drawing exceeds a first threshold value, the function control section causes the figure drawing performed by the second figure drawing section to function in the page to be processed.

4. The drawing processing device according to claim 3, wherein if the number of figures in the page to be processed exceeds a second threshold value, the function control section causes the figure drawing performed by the second figure drawing section to function in a next page to be processed.

5. The drawing processing device according to claim 3, wherein if the number of figure patterns registered in the figure pattern registration section is equal to or larger than a fourth threshold value, the function control section causes the figure drawing performed by the second figure drawing section to function in a next page to be processed.

6. The drawing processing device according to claim 3, if the number of figures in the page to be processed is less than a second threshold value, the function control section performs the control based on a determination result of the threshold-value determination section in the next page to be processed.

7. The drawing processing device according to claim 3, wherein if a determination condition is not met, the function control section causes the figure drawing performed by the second figure drawing section not to function and causes figure drawing performed by the first figure drawing section to function.

8. The drawing processing device according to claim 7, wherein in pages subsequent to a page in which the figure drawing performed by the first figure drawing section is caused to function, the function control section continues to cause the figure drawing performed by the first figure drawing section to function.

9. The drawing processing device according to claim 3, wherein in pages subsequent to a page in which the figure drawing performed by the second figure drawing section is caused to function, the function control section prohibits the threshold-value determination section from performing the threshold-value determination and continues to cause the figure drawing performed by the second figure drawing section to function.

10. The drawing processing device according to claim 9, wherein if the number of pages being in a state where it is continued to cause the figure drawing to function reaches a seventh threshold value, the function control section releases the function state.

11. The drawing processing device according to claim 3, wherein if the figure drawing performed by the second figure drawing section is caused to function, the function control section prohibits the threshold-value determination section from performing the threshold-value determination.

12. The drawing processing device according to claim 3, wherein the function control section prohibits registration of a figure pattern in the figure pattern registration section in a page where the figure drawing performed by the second figure drawing section is caused to function.

13. The drawing processing device according to claim 3, wherein the function control section prohibits registration of a figure pattern in the figure pattern registration section in a page where the figure drawing performed by the second figure drawing section is caused to function after it is completed to register a figure pattern in the figure pattern registration section.

14. The drawing processing device according to claim 3, wherein the function control section prohibits registration of a figure pattern in the figure pattern registration section in a page where it is determined as to whether or not the frequency at which the second figure drawing section performs the figure drawing exceeds the first threshold value.

15. The drawing processing device according to claim 2, wherein if the number of figure patterns registered in the figure pattern registration section is less than a fifth threshold value being smaller than a fourth threshold value, the function control section performs the control based on a determination result of the threshold-value determination section in the next page to be processed.

16. The drawing processing device according to claim 2, wherein if the number of figure patterns registered in the figure pattern registration section exceeds a fifth threshold value being smaller than a fourth threshold value and is less than the fourth threshold value, the function control section causes figure drawing performed by the first figure drawing section to function.

17. The drawing processing device according to claim 2, wherein
   if the number of figures in the page to be processed exceeds a sixth threshold value being smaller than the number of figure patterns registered in the figure pattern registration section, the function control section causes the figure drawing performed by the second figure drawing section to function in the page to be processed, and
   if the number of figures in the page to be processed is less than the sixth threshold value, the function control section maintains the figure patterns registered in the figure pattern registration section and causes figure drawing performed by the first figure drawing section to function in the page to be processed.

18. The drawing processing device according to claim 17, wherein
if the number of pages in which the figure drawing performed by the first figure drawing section or the second figure drawing section continues reaches an eighth threshold value, the function control section does not cause the figure drawing performed by the second figure drawing section to function, causes the figure drawing performed by the first figure drawing section to function, deletes the figure pattern registered in the figure pattern registration section and registers a figure pattern in the figure pattern registration section.

19. An image output apparatus comprising:
a rendering section that performs rendering and generates a figure pattern based on a drawing command;
a first figure drawing section configured to draw a figure based on a figure pattern obtained from the rendering section;
a figure pattern registration section, wherein when the rendering section performs the rendering and generates a figure pattern, the figure pattern registration section registers the figure pattern;
a second figure drawing section configured such that, if a drawing command is received and if a figure pattern corresponding to the received drawing command is registered in the figure pattern registration section, the second figure drawing section selects the corresponding registered figure pattern and draws a figure;
a function control section, wherein based on a drawing state of figures in a page to be processed, the function control section controls whether or not figure drawing performed by the second figure drawing section is caused to function in a next page to be processed; and
an image output section that outputs an image to an output medium based on drawn information.

20. A non-transitory computer-readable medium storing a program that causes a computer to execute a drawing process, the drawing process comprising:
(a) performing rendering and generating a figure pattern based on a drawing command;
(b) drawing a figure based on a figure pattern obtained by performing the rendering;
(c) when the rendering is performed, registering the generated figure pattern;
(d) if a drawing command is received and if a figure pattern corresponding to the received figure drawing command has been registered, selecting the corresponding registered figure pattern and drawing a figure in place of the step (c); and
(e) based on an appearance state of figures in a page to be processed, controlling whether or not figure drawing performed in the step (d) is caused to function in the page to be processed.

* * * * *